(12) United States Patent
Mysore Jagadeesh et al.

(10) Patent No.: US 12,242,330 B2
(45) Date of Patent: Mar. 4, 2025

(54) ASSOCIATING CAPABILITIES AND ALARMS

(71) Applicant: Oracle International Corporation, Redwood Shores, CA (US)

(72) Inventors: Kavyashree Mysore Jagadeesh, Seattle, WA (US); Erik Joseph Miller, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 18/164,283

(22) Filed: Feb. 3, 2023

(65) Prior Publication Data

US 2023/0251921 A1  Aug. 10, 2023

Related U.S. Application Data

(60) Provisional application No. 63/314,972, filed on Feb. 28, 2022, provisional application No. 63/312,814, filed on Feb. 22, 2022, provisional application No. 63/308,003, filed on Feb. 8, 2022.

(51) Int. Cl.
*G06F 11/07* (2006.01)

(52) U.S. Cl.
CPC ...... *G06F 11/0772* (2013.01); *G06F 11/0703* (2013.01); *G06F 11/079* (2013.01)

(58) Field of Classification Search
CPC ............. G06F 11/0772; G06F 11/0703; G06F 11/079; G06F 11/0709
See application file for complete search history.

(56) References Cited

U.S. PATENT DOCUMENTS

| | | | |
|---|---|---|---|
| 10,063,644 B1 | 8/2018 | Pai et al. | |
| 2006/0225032 A1* | 10/2006 | Klerk | G06F 8/10 717/105 |
| 2012/0060165 A1* | 3/2012 | Clarke | G06F 11/3006 709/224 |

(Continued)

OTHER PUBLICATIONS

International Application No. PCT/US2023/062052, "International Search Report and Written Opinion", mailed Apr. 26, 2023, 10 pages.

*Primary Examiner* — Matthew M Kim
*Assistant Examiner* — Matthew N Putaraksa
(74) *Attorney, Agent, or Firm* — Kilpatrick Townsend & Stockton LLP

(57) ABSTRACT

Techniques are described for monitoring the health of services in a computing environment such as a data center. More particularly, the present disclosure describes techniques for monitoring the health and availability of capabilities in a computing environment such as a data center by enabling alarms to be associated with the capabilities. A capability refers to a set of resources in a data center. By providing the ability to associate an alarm with a capability, the health or availability of the associated capability can be monitored or ascertained by tracking the state of the alarm associated with the capability. For example, if the alarm associated with a particular capability is triggered, it may indicate that the particular capability and the one or more resources corresponding to the particular capability are not in a healthy state. Accordingly, by monitoring alarms associated with capabilities, the health of the associated capabilities can be ascertained.

18 Claims, 13 Drawing Sheets

(56) References Cited

U.S. PATENT DOCUMENTS

| | | |
|---|---|---|
| 2015/0170508 A1 | 6/2015 | Lvin |
| 2017/0228227 A1 | 8/2017 | Winterfeldt et al. |
| 2020/0112497 A1* | 4/2020 | Yenumulapalli ........ H04L 43/10 |
| 2020/0409715 A1* | 12/2020 | Balasubramanian ........................ G06F 11/3065 |
| 2021/0149783 A1* | 5/2021 | Gudka .................. G06F 11/302 |
| 2021/0224076 A1* | 7/2021 | Dockter ................ G06F 9/5005 |
| 2022/0311680 A1* | 9/2022 | Huang ................ H04L 41/0816 |
| 2023/0205657 A1* | 6/2023 | Deboy .................. G06F 11/079 714/22 |
| 2023/0323632 A1* | 10/2023 | Saegusa ............... H04W 24/08 701/2 |
| 2024/0073092 A1* | 2/2024 | Peuziat ............... H04L 41/0895 |

* cited by examiner

ASSOCIATING CAPABILITIES AND ALARMS

CROSS-REFERENCE TO RELATED APPLICATIONS

This application is a non-provisional of and claims the benefit and priority under 35 U.S.C. 119(e) of the following provisional applications:
 (1) U.S. Provisional Application No. 63/314,972, filed on Feb. 28, 2022, entitled "Associating Capabilities And Alarms,"
 (2) U.S. Provisional Application No. 63/308,003, filed on Feb. 8, 2022, entitled "Techniques For Bootstrapping A Region Build;" and
 (3) U.S. Provisional Application No. 63/312,814, filed on Feb. 22, 2022, entitled "Techniques For Implementing Virtual Data Centers."
The contents of the above-mentioned applications are incorporated by reference herein in their entirety for all purposes.

FIELD OF TECHNOLOGY

The present disclosure relates to improved techniques for monitoring the health of services in a computing environment such as a data center. More particularly, the present disclosure describes techniques for monitoring the health and availability of capabilities in a computing environment such as a data center by enabling alarms to be associated with the capabilities.

BACKGROUND

Cloud infrastructure providers may offer cloud computing infrastructure and related services in numerous geographical areas worldwide. To provide this infrastructure, the cloud infrastructure provider may operate one or more data centers corresponding to a localized geographical area. These data centers may be included as part of a "region," a logical abstraction of the geographical area and the computing resources of the one or more data centers. Building new regions can include provisioning the computing resources, configuring infrastructure, and deploying code to those resources. Conventional techniques for building a region involve significant manual operations. Bootstrapping existing services into a new region may be challenging since a service may depend on the functionality of other existing services and/or resources in the region. Relying on manual operations to bootstrap services and/or build regions incurs substantial time costs, risks associated with manual configuration errors, and may not scale well.

BRIEF SUMMARY

The present disclosure relates to improved techniques for monitoring the health of services in a computing environment such as a data center. More particularly, the present disclosure describes techniques for monitoring the health and availability of capabilities in a computing environment such as a data center by enabling alarms to be associated with the capabilities. A capability refers to a set of resources in a data center. By providing the ability to associate an alarm with a capability, the health or availability of the associated capability can be monitored or ascertained by tracking the state of the alarm associated with the capability. For example, if the alarm associated with a particular capability is triggered, it may indicate that the particular capability and the one or more resources corresponding to the particular capability are not in a healthy state. Accordingly, by monitoring alarms associated with capabilities, the health of the associated capabilities can be ascertained. Various embodiments are described herein, including methods, systems, non-transitory computer-readable storage media storing programs, code, or instructions executable by one or more processors, and the like.

In certain implementations, a capability identifies a unit of functionality associated with a service and can refer to a set of resources associated with the service in a data center. By providing the ability to associate an alarm with a capability, the health or availability of the associated capability can be monitored or ascertained by tracking the state of the alarm associated with the capability. For example, if the alarm associated with a particular capability is triggered, it may indicate that the particular capability and the one or more resources corresponding to the particular capability are not in a healthy state. Accordingly, by monitoring alarms associated with capabilities, the health of the associated capabilities can be ascertained. Multiple such capabilities and associated alarms may be configured in a computing environment such as in a data center.

In certain implementations, techniques (e.g., methods, systems, non-transitory computer-readable storage media storing executable instructions) are provided for creating an association between an alarm and a capability, the capability corresponding to a set of resources for a service. Once an association has been created, the alarm can be monitored and when determined to be in a triggered state, a state of the capability associated with the alarm can be changed from a healthy to an unhealthy state. In certain implementations, the association between an alarm and a capability is declared in a flock configuration associated with a service.

In certain embodiments, the alarms-to-capabilities associations information can be used to determine the health of capabilities published in a computing environment such as in a data center. A set of capabilities published in a data center may be determined. Based upon alarms-to-capabilities associations information, a set of alarms associated with the set of capabilities is identified. The alarms are monitored and it may be determined that a first alarm in the set of alarms is in a triggered state. A subset of capabilities, from the set of published capabilities, that are associated with the triggered first alarm is determined. A state of each capability in the subset of capabilities is updated from a healthy state to an unhealthy state.

In one general aspect, the techniques may include identifying an association between an alarm and a capability, where the capability corresponds to a functionality associated with a first service. The techniques may also include monitoring the alarm and the techniques may furthermore include determining that the alarm is in a triggered state based on the monitoring. In addition, the technqies can include changing a state of the capability from a healthy state to an unhealthy state in response to a determination that the monitoring.

Implementations may include one or more of the following features. Techniques where the functionality associated with the first service corresponds to a resource associated with the service. Techniques where the association between the alarm and the capability is declared in a flock configuration for the service, the flock configuration identifying a set of resources associated with the service. Techniques where the flock configuration identifies one or more parameters related to the service and a configuration setting for at least one resource related to the service. Techniques may include: determining that a release of a flock for a second service has failed; determining that the flock is dependent on the capability; and outputting a message indicating the capability and the unhealthy state of the alarm as a reason for failure of the release of the flock for the second service. The techniques may include: delaying a release of the flock based on changing the state of the capability from healthy to unhealthy. In addition, techniques may include: retrying the release of the flock for the second service upon determining that the state of the capability is healthy. Techniques may include: responsive to changing the state of the capability to unhealthy: determining one or more dependent capabilities that are dependent upon the capability whose state is changed from healthy to unhealthy; and changing the state of each of the one or more dependent capabilities to unhealthy. The techniques can include implementations where the monitoring is performed by a telemetry service. Techniques may include: creating an association between the alarm and a second capability, the second capability corresponding to a functionality associated with a second service, where the second service is different from the first service. Furthermore, the techniques may include: identifying a set of one or more capabilities published in a data center that are marked as healthy and that are associated with the alarm; and changing the state of each capability in the set of one or more capabilities from a healthy to unhealthy.

In one general aspect, techniques may include determining a set of direct capabilities for a flock configuration of a flock for which a release is to be scheduled. Techniques may also include identifying a set of indirect capabilities that depend from the set of direct capabilities. Some techniques may furthermore include determining a set of alarms associated with at least one of the set of direct capabilities or the set of indirect capabilities. Techniques may in addition include monitoring a set of alarm states for the set of alarms. Some techniques may moreover include determining that at least one alarm of the set of alarms is in a triggered state based on the monitoring. Techniques may also include responsive to determining that the at least one alarm is in a triggered state, changing a state of the capabilities associated with the triggered alarm from healthy to unhealthy.

Implementations may include one or more of the following features. Techniques that include: updating a health state of the set of direct capabilities and the set of direct capabilities from a healthy state to an unhealthy state. Techniques that include: delaying a release of the flock based on changing the state of the capability from healthy to unhealthy. Implementations of the described techniques may include hardware, a techniques or process, or a computer tangible medium.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
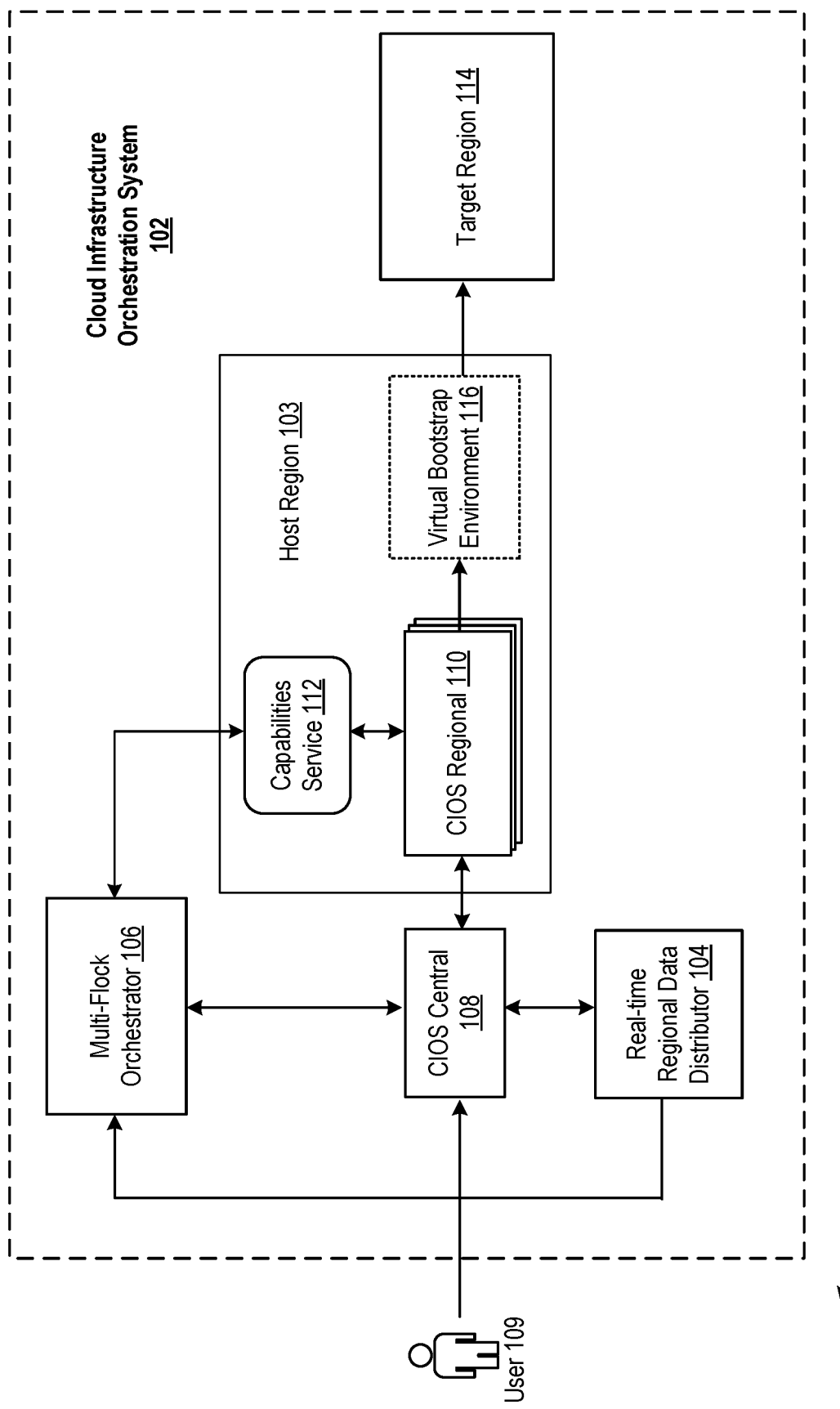
FIG. 1 is a block diagram of an environment in which a Cloud Infrastructure Orchestration Service (CIOS) may operate to dynamically provide bootstrap services in a region, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily construed as preferred or advantageous over other embodiments or designs.

Techniques are described for monitoring the health of services in a computing environment such as a data center. More particularly, the present disclosure describes techniques for monitoring the health and availability of capabilities in a computing environment such as a data center by enabling alarms to be associated with the capabilities. A capability refers to a set of resources in a data center. By providing the ability to associate an alarm with a capability, the health or availability of the associated capability can be monitored or ascertained by tracking the state of the alarm associated with the capability. For example, if the alarm associated with a particular capability is triggered, it may indicate that the particular capability and the one or more resources corresponding to the particular capability are not in a healthy state. Accordingly, by monitoring alarms associated with capabilities, the health of the associated capabilities can be ascertained.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure, and which are used to provide a cloud service to a customer, are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data center and includes a set of resources that are used to provide the set of services.

Building a new data center in a region is a very complex activity requiring extensive coordination between various bootstrapping activities. At a high level, this involves the performance and coordination of various tasks such as: identifying the set of services to be provided by the data center; identifying various resources that are needed for providing the set of services; creating, provisioning, and deploying the identified resources; wiring the resources properly so that they can be used in an intended manner; and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example many months, to build a data center. Additionally, the process is very error prone, sometimes requiring several iterations before a desired configuration of the data center is achieved, which further adds to the time taken to build a data center. These limitations and problems severely limit a CSP's ability to grow computing resources in a timely manner responsive to increasing customer needs.

The present disclosure describes techniques for reducing build time, reducing computing resource waste, and reducing risk related to building one or more data centers in a region. Instead of weeks and months needed to build a data center in a region in the past, the techniques described herein can be used to build a new data center in a region in a relatively much shorter time, while reducing the risk of errors over conventional approaches.

A Cloud Infrastructure Orchestration Service (CIOS) is disclosed herein that is configured to bootstrap (e.g., provision and deploy) services into a new data center based on predefined configuration files that identify the resources (e.g., infrastructure components and software to be deployed) for implementing a given change to the data center. The CIOS can parse and analyze configuration files (e.g., flock configs) to identify dependencies between resources, execution targets, phases, and flocks. The CIOS may generate specific data structures from the analysis and may use these data structures to drive operations and to manage an order by which services are bootstrapped to a region. The CIOS may utilize these data structures to identify when it can bootstrap a service, when bootstrapping is blocked, and/or when bootstrapping operations associated with a previously blocked service can resume. Advantageously, the CIOS can identify circular dependencies within the data structures and execute operations to eliminate/resolve these circular dependencies prior to task execution. Using these techniques, the CIOS substantially reduces the risk of executing tasks prior to the availability of the resources on which those tasks depend.

Utilizing the techniques disclosed herein, the CIOS may optimize parallel processing to execute changes to a data center while ensuring that tasks are not initiated until the functionality on which those tasks depend is available in the region. In this manner, the CIOS enables a region build to be performed more efficiently, which greatly reduces the time required to build a data center and the wasteful computing resource use found in conventional approaches.

Certain Definitions

A "region" is a logical abstraction corresponding to a geographical location. A region can include any suitable number of one or more execution targets. In some embodiments, an execution target could correspond to a data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file) for an infrastructure component, or the like.

A "flock config" refers to a configuration file (or a set of configuration files) that describes a set of all resources (e.g., infrastructure components and artifacts) associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "capability" identifies a unit of functionality associated with a service. The unit could be a portion, or all, of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A Multi-Flock Orchestrator (MFO) may be a computing component (e.g., a service) that coordinates events between components of the CIOS to provision and deploy services to a target region (e.g., a new region). An MFO tracks relevant events for each service of the region build and takes actions in response to those events.

A "host region" refers to a region that hosts a virtual bootstrap environment (ViBE). A host region may be used to bootstrap a ViBE.

A "target region" refers to a region under build.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a flock configured to model dependencies between different flocks. A capabilities service may be provided within a Cloud Infrastructure Orchestration Service and may define what capabilities, services, features have been made available in a region.

A "Real-time Regional Data Distributor" (RRDD) may be a service or system configured to manage region data. This region data can be injected into flock configs to dynamically create execution targets for new regions.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and a Multi-Flock Orchestrator (also described in further detail below) configured to initiate/manage region builds (e.g., bootstrapping operations corresponding to multiple services).

The CIOS enables region building and world-wide infrastructure provisioning and code deployment with minimal manual run-time effort from service teams (e.g., beyond an initial approval and/or physical transportation of hardware, in some instances). The high-level responsibilities of the CIOS include, but are not limited to, coordinating region builds, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

The CIOS can perform plan generation, where differences between the desired and current state of the resources are identified. Part of plan generation can include identifying the operations that would need to be executed to bring the resources from the current state to the desired state. In some examples, the CIOS may present a generated plan to a user for approval. In these examples, the CIOS can mark the plan as approved or rejected based on user input from the user. Thus, users can spend less time reasoning about the plan and the plans are more accurate because they are machine generated. Plans are almost too detailed for human consumption; however, the CIOS can provide this data via a sophisticated user interface (UI).

In some examples, the CIOS can handle execution of change management by executing the approved plan. Once an execution plan has been created and approved, engineers may no longer need to participate in change management unless the CIOS initiates roll-back. The CIOS can handle rolling back to a previous service version by generating a plan that returns the service to a previous (e.g., pre-release) state (e.g., when CIOS detects service health degradation while executing).

The CIOS can measure service health by monitoring alarms and executing integration tests. The CIOS can help teams quickly define roll-back behavior in the event of service degradation, which it can later execute. The CIOS can generate and display plans and can track approval. The CIOS can combine the functionality of provisioning and deployment in a single system that coordinates these tasks across a region build. The CIOS also supports the discovery of flocks (e.g., service resources such as flock config(s) corresponding to any suitable number of services), artifacts, resources, and dependencies. The CIOS can discover dependencies between execution tasks at every level (e.g., resource level, execution target level, phase level, service level, etc.) through a static analysis (e.g., including parsing and processing content) of one or more configuration files. Using these dependencies, the CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration Service (CIOS) 102 may operate to dynamically provide bootstrap services in a region, according to at least one embodiment. CIOS 102 can include, but is not limited to, the following components: Real-time Regional Data Distributor (RRDD) 104, Multi-Flock Orchestrator (MFO) 106, CIOS Central 108, CIOS Regional 110, and Capabilities Service 112. Specific functionality of CIOS Central 108 and CIOS Regional 110 is provided in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 may be configured to manage region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to MFO 106 and/or CIOS Regional 110 (e.g., each instance of CIOS Regional 110). In some embodiments, MFO 106 and/or any suitable component or module of CIOS Regional 110 may be configured to request capabilities data from Capabilities Service 112.

In some embodiments, Multi-Flock Orchestrator (MFO) 106 may be configured to drive region build efforts. In some embodiments, MFO 106 can manage information that describes what flock/flock config versions and/or artifact versions are to be utilized to bootstrap a given service within a region (or to make a unit of change to a target region). In some embodiments, MFO 106 may be configured to monitor (or be otherwise notified of) changes to the region data managed by Real-time Regional Data Distributor 104. In some embodiments, receiving an indication that region data has been changed may cause a region build to be triggered by MFO 106. In some embodiments, MFO 106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

Multi-Flock Orchestrator 106 can perform a static flock analysis in which the flock configs are parsed to identify dependencies between resources, execution targets, phases, and flocks, and in particular to identify circular dependencies that need to be removed. In some embodiments, MFO 106 can generate any suitable number of data structures based on the dependencies identified. These data structures (e.g., directed acyclic graph(s), linked lists, etc.) may be utilized by the Cloud Infrastructure Orchestration Service 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, MFO may be configured to notify any suitable service teams that changes are required to the corresponding flock config to correct these circular dependencies. MFO 106 can be configured to traverse one or more data structures to manage an order by which services are bootstrapped to a region. MFO 106 can identify (e.g., using data obtained from Capabilities Service 112) capabilities available within a given region at any given time. MFO 106 can this data to identify when it can bootstrap a service, when bootstrapping is blocked, and/or when bootstrapping operations associated with a previously blocked service can resume. Based on this traversal, MFO 106 can perform a variety of releases in which instructions are transmitted by MFO 106 to CIOS Central 108 to perform bootstrapping operations corresponding to any suitable number of flock configs. 1n some examples, MFO 106 may be configured to identify that one or more flock configs may require multiple releases due to circular dependencies found within the graph. As a result, MFO 106 may transmit multiple instruction sets to CIOS Central 108 for a given flock config to break the circular dependencies identified in the graph.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). MFO 106 can leverage resources of the host region 103 to bootstrap resources to the ViBE 116 (generally referred to as "building the ViBE"). By way of example, MFO 106 can provide instructions through CIOS Central 108 that cause an instance of CIOS Regional 110 within a host region (e.g., host region 103) to bootstrap another instance of CIOS Regional within the ViBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
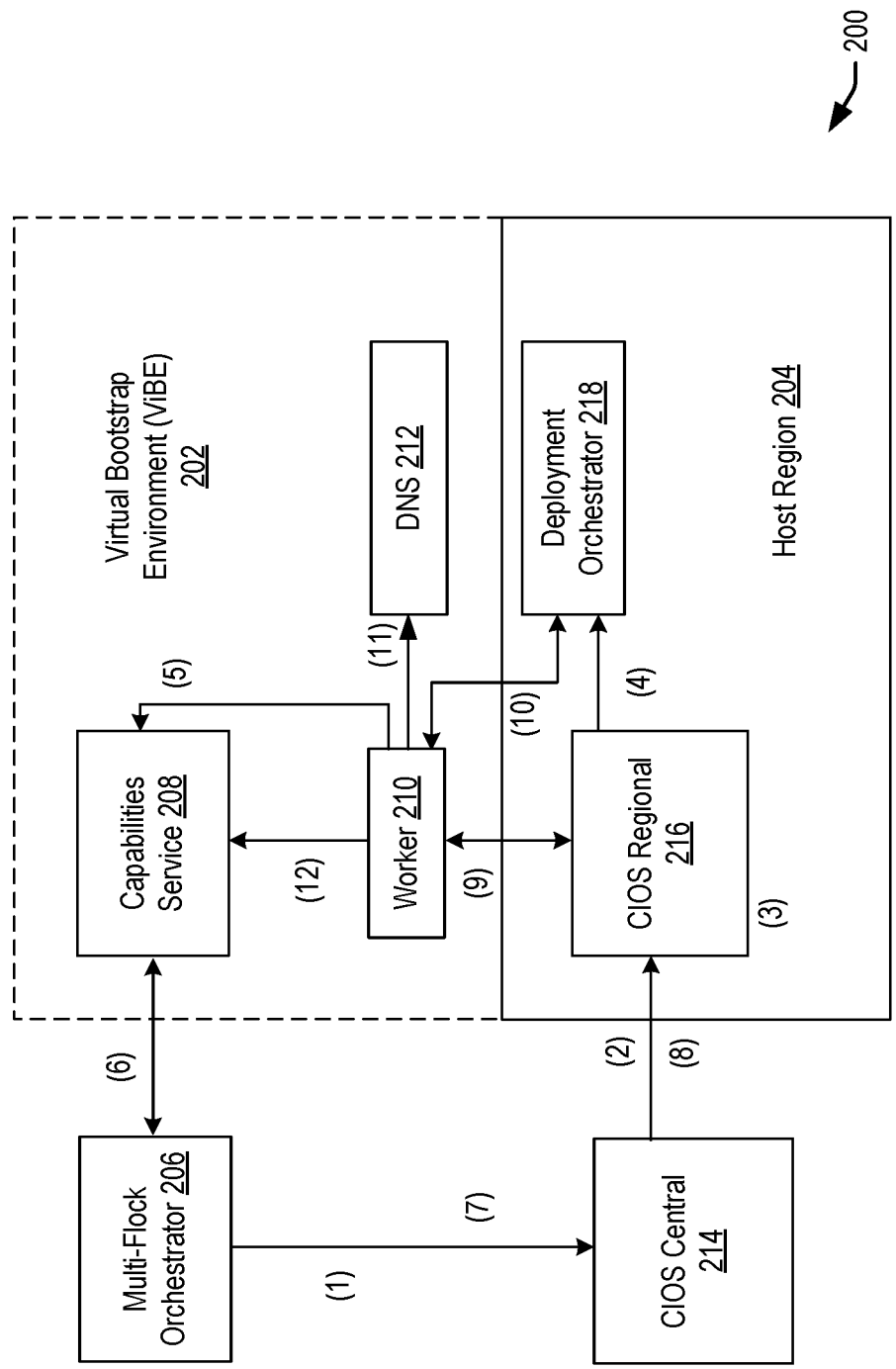
FIG. 2 is a block diagram for illustrating an environment and method for building a virtual bootstrap environment (ViBE), according to at least one embodiment.

FIG. 2 is a block diagram for illustrating an environment 200 and method for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services (e.g., flocks) into a region. The ViBE 202 may be a tenancy that is deployed in a host region 204. It can be thought of as a virtual region.

When the target region is available to provide bootstrapping operations, the ViBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the ViBE 202 allows for standing up the dependencies and services needed to be able to provision/prepare infrastructure and deploy software while making use of the host region's resources in order to break circular dependencies of core services.

Multi-Flock Orchestrator (MFO) 206 may be configured to perform operations to build (e.g., configure) ViBE 202. MFO 206 can obtain applicable flock configs corresponding to various resources to be bootstrapped to the new region (in this case, a ViBE region, ViBE 202). By way of example, MFO 206 may obtain a flock config (e.g., a "ViBE flock config") that identifies aspects of bootstrapping Capabilities Service 208 and Worker 210. As another example, MFO 206 may obtain another flock config corresponding to bootstrapping Domain Name Service (DNS) 212 to ViBE 202.

At step 1, MFO 206 may instruct CIOS Central 214 (e.g., an example of CIOS Central 108 and CIOS Central 214 of FIGS. 1 and 2, respectively). For example, MFO 206 may transmit a request (e.g., including the ViBE flock config) to request bootstrapping of the Capabilities Service 208 and Worker 210 that, at this time do not yet exist in the ViBE 202. In some embodiments, CIOS Central 214 may have access to all flock configs. Therefore, in some examples, MFO 206 may transmit an identifier for the ViBE flock config rather than the file itself, and CIOS Central 214 may independently obtain it from storage (e.g., from DB 308 or flock DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208 and Worker 210 to be bootstrapped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, MFO 206 may identify that the capability indicating that Capabilities Service 208 and Worker 210 are available based on receiving or obtaining data (an identifier corresponding to the capability) from the Capabilities Service 208.

At step 7, as a result of receiving/obtaining the data at step 6, the MFO 206 may instruct CIOS Central 214 to bootstrap a DNS service (e.g., DNS 212) to the ViBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 notifies Capabilities Service 208 that DNS 212 is available in ViBE 202. MFO 206 may subsequently identify that the resources associated with the ViBE flock config and the DNS flock config are available any may proceed to bootstrap any suitable number of additional resources to the ViBE.

After steps 1-12 are concluded, the process for building the ViBE 202 can be considered complete and the ViBE 202 can be considered built.

Figure 3:
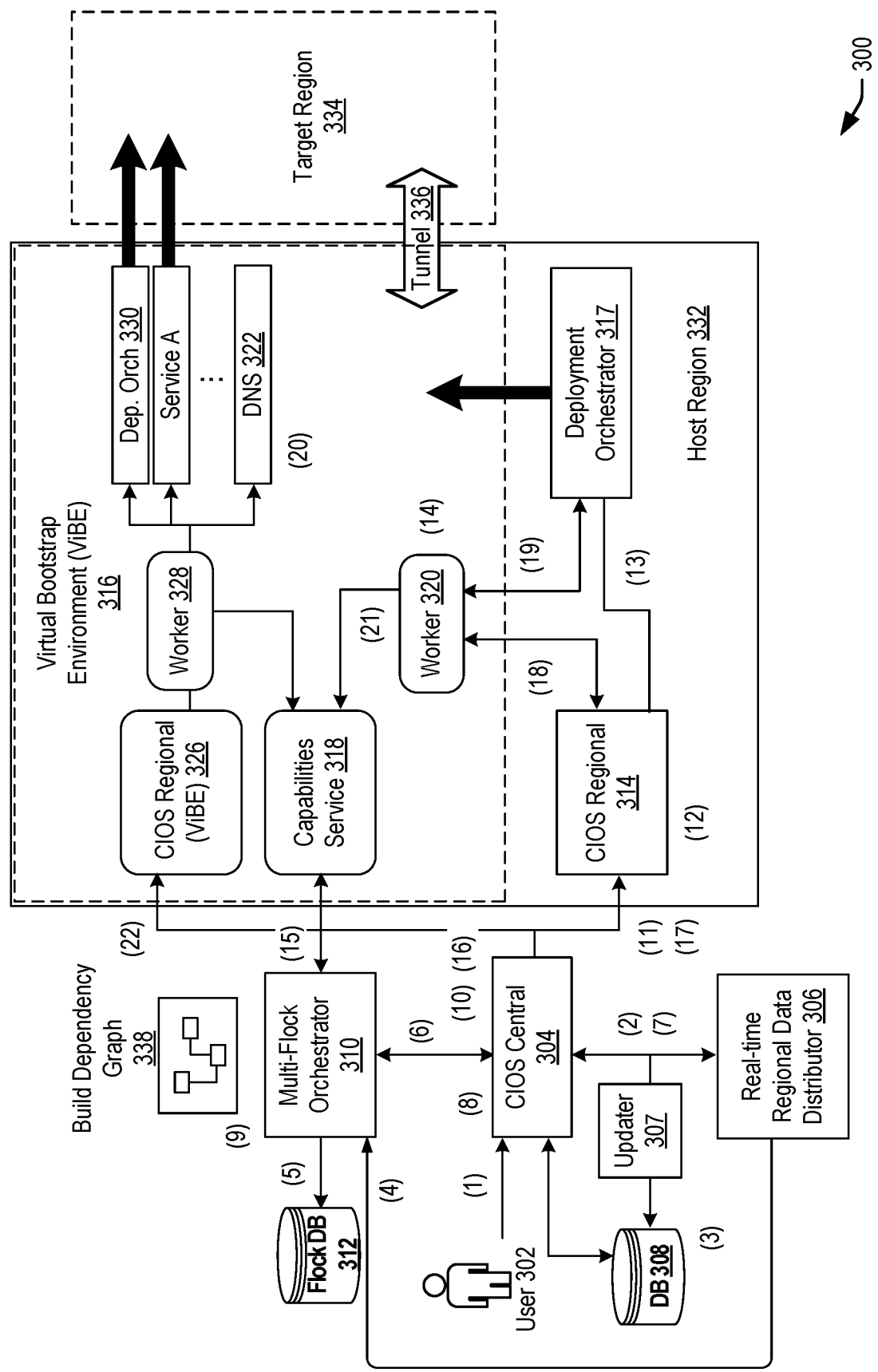
FIG. 3 is a block diagram for illustrating an environment and method for bootstrapping services to a target region utilizing the ViBE, according to at least one embodiment.

FIG. 3 is a block diagram for illustrating an environment 300 and method for bootstrapping services to a target region utilizing the ViBE, according to at least one embodiment.

At step 1, user 302 may utilize any suitable user interface provided by CIOS Central 304 (an example of CIOS Central 108 and CIOS Central 214 of FIGS. 1 and 2, respectively) to modify region data. By way of example, user 302 may create a new region to which a number of services are to be bootstrapped.

At step 2, CIOS Central 304 may execute operations to send the change to RRDD 306 (e.g., an example of RRDD 104 of FIG. 1). At step 3, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 4, MFO 310 (an example of the MFO 106 and 206 of FIGS. 1 and 2, respectively) may detect the change in region data. In some embodiments, MFO 310 may be configured to poll RRDD 306 for changes in region data. In some embodiments, RRDD 306 may be configured to publish or otherwise notify MFO 310 of region changes.

At step 5, detecting the change in region data may trigger MFO 310 to obtain a version set (e.g., a version set associated with a particular identifier such as a "golden version set" identifier). identifying a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in flock DB 312 such that MFO 310 may identify which versions of flock configs and artifacts to use for building a region (e.g., a ViBE region, a Target Region/non-ViBE Region, etc.). The flock configs (e.g., all versions of the flock configs) and/or artifacts (e.g., all versions of the artifacts) may be stored in DB 308, DB 312, or any suitable data store accessible to the CIOS Central 304 and/or MFO 310.

At step 6, MFO 310 may request CIOS Central 304 to recompile of each of the flock configs associated with the version set with the current region data. In some embodiments, the request may indicate a version for each flock config and/or artifact corresponding to those flock configs.

At step 7, CIOS Central 304 may obtain current region data from the DB 308 (e.g., directly, or via Real-time Regional Data Distributor 306) and retrieve any suitable flock config and artifact in accordance with the versions requested by MFO 310.

At step 8, CIOS Central 304 may recompile the flock configs with the region data obtained at step 7 to inject the flock configs with current region data. CIOS Central 304 may return the compiled flock configs to MFO 310. In some embodiments, CIOS Central 304 may simply indicate compilation is done, and MFO 310 may access the recompiled flock configs via RRDD 306.

At step 9, MFO 310 may perform a static analysis of the recompiled flock configs. As part of the static analysis, MFO 310 may parse the flock configs (e.g., using a library associated with a declarative infrastructure provisioner (e.g., Terraform, or the like)) to identify dependencies between flocks. From the analysis and the dependencies identified, MFO 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable portion of a particular flock. The specific bootstrapping order may be identified based at least in part on the dependencies. In some embodiments, the dependencies may be expressed as an attribute of the node and/or indicated via edges of the graph that connect the nodes. MFO 310 may traverse the graph (e.g., beginning at a starting node) to drive the operations of the region build.

In some embodiments, MFO 310 may utilize a cycle detection algorithm to detect the presence of a cycle (e.g., service A depends on service B and vice versa). MFO 310 can identify orphaned capabilities dependencies. For example, MFO 310 can identify orphaned nodes of the Build Dependency Graph 338 that do not connect to any other nodes. MFO 310 may identify falsely published capabilities (e.g., when a capability was prematurely published, and the corresponding functionality is not actually yet available). MFO 310 can detect from the graph that one or more instances of publishing the same capability exist. In some embodiments, any suitable number of these errors may be detected and MFO 310 (or another suitable component such as CIOS Central 304) may be configured to notify or otherwise present this information to users (e.g., via an electronic notification, a user interface, or the like). In some embodiments, MFO 310 may be configured to force delete/recreate resources to break circular dependencies and may once again provide instructions to CIOS Central 304 to perform bootstrapping operations for those resources and/or corresponding flock configs.

A starting node may correspond to bootstrapping the ViBE flock, a second node may correspond to bootstrapping DNS. The steps 10-15 correspond to deploying (via deployment orchestrator 317, an example of the deployment orchestrator 218 of FIG. 2) a ViBE flock to ViBE 316 (e.g., an example of ViBE 116 and 202 of FIGS. 1, and 2, respectively). That is, steps 10-15 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the MFO 310 recommence traversal of the Build Dependency Graph 338 to identify next operations to be executed.

By way of example, MFO 310 may continue traversing the Build Dependency Graph 338 to identify that a DNS flock is to be deployed. Steps 16-21 may be executed to deploy DNS 322 (an example of the DNS 212 of FIG. 2). These operations may generally correspond to steps 7-12 of FIG. 2.

At step 21, a capability may be stored indicating that DNS 322 is available. Upon detecting this capability, MFO 310 may recommence traversal of the Build Dependency Graph 338. On this traversal, the MFO 310 may identify that any suitable portion of an instance of CIOS Regional (e.g., an example of CIOS Regional 314) is to be deployed to the ViBE 316. In some embodiments, steps 16-21 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, MFO 310 may recommence traversal of the Build Dependency Graph 338. On this traversal, the MFO 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, MFO 310 may instruct subsequent bootstrapping requests to be routed to ViBE components rather than utilizing host region components (components of host region 332). Thus, MFO 310 can continue traversing the Build Dependency Graph 338, at each node instructing flock deployment to the ViBE 316 via CIOS Central 304. CIOS Central 304 may request CIOS Regional (ViBE) 326 to deploy resources according to the flock config.

At some point during this process, Target Region 334 may become available. Indication that the Target Region is available may be identifiable from region data for the Target Region 334 being provided by the user 302 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP), and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's 334 network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to capabilities service 318, CIOS Regional (ViBE) 326 can orchestrate the deployment of instances of core services from the ViBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave. The deployment operations may generally correspond to steps 16-21 described above.

As a service is deployed from the ViBE 316 to the Target Region 334, the DNS record associated with that service may correspond to the instance of the service in the ViBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

Associating Capabilities and Alarms

The present disclosure relates to improved techniques for monitoring the health of services in a computing environment such as a data center. More particularly, the present disclosure describes techniques for monitoring the health and availability of capabilities in a computing environment such as a data center by enabling alarms to be associated with the capabilities.

In certain implementations, a capability identifies a unit of functionality associated with a service and can refer to a set of resources associated with the service. By providing the ability to associate an alarm with a capability, the health or availability of the associated capability can be monitored or ascertained by tracking the state of the alarm associated with the capability. For example, if the alarm associated with a particular capability is triggered, it may indicate that the particular capability and the one or more resources corresponding to the particular capability are not in a healthy state. Accordingly, by monitoring alarms associated with capabilities, the health of the associated capabilities can be ascertained. Multiple such capabilities and associated alarms may be configured in a computing environment such as in a data center.

The ability to create associations between alarms and capabilities can be used for various applications and use cases. In certain implementations, for example in the embodiment depicted in FIG. 1, a telemetry system may be provided in a data center (e.g., in host region 103 or in target region 114) where the telemetry system comprises infrastructure that is configured to monitor alarms and determine the states of the alarms in one or more data centers in the region. The telemetry system may be aware of alarms configured for the data center. In a simple example, an alarm may have two states: (1) a normal state; and (2) a triggered or abnormal state indicative of a deviance from the normal state, where the alarm may be triggered due to some underlying problem. In certain embodiments, an alarm can continue to be triggered until the underlying condition triggering the alarm has been resolved.

In certain implementations, techniques are described that enable different health states to be associated with a capability. In one embodiment, the health state associated with a capability can have one of two values: (1) a healthy state, indicating that the capability is published and available in its proper intended state; or (2) an unhealthy state, indicating an error condition for the capability. In certain implementations, when a capability is marked as unhealthy, it is also marked an unpublished (i.e., not published) and unavailable.

An alarm may be triggered by different causes. For example, an alarm may be triggered by a canary (which is an application that drives synthetic traffic to a service to monitor/gauge the health of a service). A canary can produce metrics regarding the health of the service. If a canary is having a problem or sees a problem with the service, it may trigger an alarm. As another example, an alarm may be triggered when a resource is not accessible or has not responded for some time. Various other reasons may cause an alarm to be triggered.

In certain implementations, a canary can also be associated with a capability. The description described herein for an alarms-to-capabilities association may also apply to a canary-to-alarm association. In some other embodiments, a capability can also be associated with other resources in a data center environment.

Additionally, a health monitoring system may be provided in a data center, where the health monitoring system is configured to monitor the state of capabilities in the data center. The health monitoring system can communicate with the telemetry system to determine the states of alarms in the data center that are monitored by the telemetry system. When the health monitoring system determines that a particular alarm is triggered, it may determine one or more capabilities, if any, that are associated with that particular alarm, and mark those capabilities as being in an unhealthy state (or unavailable or error state). The health monitoring system may then initiate or perform one or more actions responsive to determining that a capability is in an unhealthy state. These one or more actions may include, for example, an action to get an unhealthy capability back to a healthy state. The monitoring of alarms and associated health monitoring of capabilities may be used in different scenarios, as described below.

In certain implementations, the health monitoring system 116 may be part of the telemetry system. In some other implementations, the health monitoring system 116 may be part of some other systems in the data center. For example, the functionality of the health monitoring system 116 may be implemented by capabilities services 112 depicted in FIG. 1.

For purposes of this application, a capability identifies a unit of functionality associated with a service. A capability can refer to a set of one or more resources, where a resource may be a software or hardware resource, a function, a service, and the like. A capability can be identified by a capability label. Examples of capability labels include "Capability_A," "Capability_B," "Capability_C," etc. For example, a capability labeled Capability_A may correspond to resources R1 and R2 and be shown as: Capability_A={R1, R2}. Likewise, Capability_B={R3}; Capability_C={R4, R5, R6}, and so on.

A capability is considered to be published (or enabled or available) in a computing environment, such as in a data center, when all the resources corresponding to that capability are created, deployed, and are usable in the data center for their intended purposes. In the example above, Capability_A can be considered to be published for a data center when resources R1 and R2 corresponding to Capability_A have been created and deployed in the data center and are ready to be used for their intended purposes.

A data center may provide different services. For a service, the set of one or more resources that are used or are needed for providing the service is referred to as a flock for the service. A flock can include one or more resources. A flock refers to a managed set of resources, typically that are responsible for providing a service. Flock related information for a service is declared as part of the flock configuration for that service. The flock configuration for a service is typically stored in the form of a file and thus also referred to as a flock configuration file for that service. A flock configuration for a service describes a flock (e.g., a set of resources including infrastructure components and artifacts associated with the service) associated with the service. The flock configuration for a service may include declarative statements that specify one or more aspects corresponding to a desired state of the resources associated with the service. The flock configuration may identify various settings and configurations related to the flock resources and other parameters related to the service. In certain implementations, the flock configuration includes Terraform code and the flock configuration files are Terraform files.

In a typical data center environment that is configured to provide multiple services, a service can have dependencies on other services or resources. For example, Service B may require that Service A exist before Service B can be bootstrapped (potentially, because Service B uses Service A). Service C may require Service B to exist before Service C can be bootstrapped in the data center. In this manner, there may be several dependencies between the services. In certain implementations, these dependencies are articulated using capabilities. For example, the flock configuration for a service may identify any capabilities on which the service depends. A capability that a service depends upon is referred to as a capability dependency of the service (also referred to as a capability dependency of the flock configuration for the service).

A flock associated with a service (also referred to as the service flock) is described in a flock configuration specified for the service. The flock configuration may be in the form of a flock configuration file. A capability dependency for a service is also referred to as a capability dependency for the flock for the service. A capability dependency for a service (e.g., the service flock capability dependency) may either be a required capability dependency or an optional capability dependency. A required capability dependency for a service (or for the service flock) is one where the capability needs to be published or enabled in a data center before a release can be scheduled for that service or service flock. An optional capability dependency for a service flock is one where, if the optional capability dependency is not published in the data center, a release for the service flock can still be scheduled for execution as long as any required capability dependencies for the flock are satisfied. An optional capability dependency thus does not block a service release. When the optional capability becomes available or published, another release for the service flock is scheduled and executed. In this manner, the flock for a service could potentially be released and executed multiple times (sometimes referred to as reentrant nature of releases for a service flock). Generally, a release is scheduled and executed for a service when the required capability dependencies for the service are published but one or more optional capability dependencies may not yet be published. A release and its subsequent execution when one or more optional capability dependencies for a service flock are not published or available results in instantiation of a version of the service that may have some capabilities but not all capabilities. It is to be noted that not every service flock needs to have a capability dependency, either required or optional.

The capability dependencies for a service may either be explicitly declared in the flock configuration for the service or may be implicitly determined (by the MFO, as described below) from the flock configuration for the service. In instances where a capability dependency is explicitly declared in the flock configuration, the flock configuration contains code or metadata that explicitly declares the capability dependency. In other instances, a capability dependency may be inferred from the code in the flock configuration, for example, inferred by MFO 106 when the MFO 106 reads and parses the flock configuration. A flock configuration for a service may identify zero or more prerequisite capabilities for the service flock specified by that flock configuration. Accordingly, it is not necessary for a service to have a capability dependency.

A release and execution of a flock for a service may potentially (not always) result in one or more capabilities being published in the data center. Information identifying any capabilities that are published due to the execution of a release of a service flock are also declared in the flock configuration for the service. In certain implementations, such as the embodiment depicted in FIG. 1, MFO 106 schedules a release for a service flock. The release is then executed, for example, by CIOS Central 108 and CIOS Regional 110 in FIG. 1, and upon successful execution of the release, zero or more capabilities may be published in the data center. In this manner, releases and corresponding executions of service flocks result in additional capabilities being published in the data center.

In certain implementations, such as the embodiment depicted in FIG. 1, as part of the process of building a data center in a region where the data center is to provide a particular set of services, the flock configurations for the particular set of services are provided to MFO 106. MFO 106 then reads and parses these flock configuration files, and for each flock described by a flock configuration, identifies the capability dependencies, if any, for the flock and the capabilities, if any, that are published upon execution of one or more releases of the flock. MFO 106 then builds an acyclic dependency graph to represent the various capability dependencies between the flock configurations and the corresponding flocks. The dependency graph also identifies a dependency ordering for the capabilities identified by the multiple flock configurations. MFO 106 can generate any suitable number of data structures based on the identified dependencies. These data structures (e.g., a directed graph, directed acyclic graph(s), linked lists, etc.) may be utilized by CIOS 102 (e.g., by MFO 106, CISO Central 108, CIOS Regional 110) to drive operations for building one or more data centers in a region (also referred to as performing a region build). The processing performed by MFO 106 in parsing of the flock configurations and generating the acyclic dependency graph is sometimes referred to as static flock analysis.

The capability dependencies between different flock specified in the flock configurations corresponding to different services can be illustrated by the following example. A flock configuration (FC_A) for Service A specifies a flock (F_A) for Service A. FC_A does not identify any capability dependencies for F_A and identifies that Capability_A is published upon successful release and execution of the flock F_A. A flock configuration (FC_B) may specify information related to a flock (F_B) for Service B and may indicate that Capability_A is a required capability dependency and that successful execution of the flock F_B for Service B results in Capability_B being published. A flock configuration (FC_C) may specific information for a flock (F_C) for a Service C and may indicate that Capability_B is a required capability dependency and the successful release and execution of the flock F_C for Service C results in Capability_C being published for the data center. Given these flock configurations, the dependency graph generated by MFO 106 identifies that:

$$FC\_A \text{ (for } F\_A) \rightarrow Capability\_A \rightarrow FC\_B \text{ (for } F\_B) \rightarrow Capability\_B \rightarrow FCC \text{ (for } F\_C) \rightarrow Capability\_C,$$

where F_A has no capability dependency, release and execution of F_A publishes Capability_A, which is a required capability dependency for F_B, which when released and executed publishes Capability_B, which is a required capability dependency for F_C, which when released and executed publishes Capability_C in the data center. In terms of capabilities, the dependency graph is as follows: Capability_B is dependent upon Capability_A, and Capability_C is dependent upon Capability_B, represented as Capability_A→Capability_B→Capability_C. In this manner, the dependency graph generated by MFO 106 for a data center identifies dependencies between multiple capabilities as declared in or inferred from the flock configurations corresponding to different services to be instantiated in the data center.

With respect to the (Capability_A→Capability_B→Capability_C) dependencies example, Capability_B is referred to as a direct dependency of Capability_C. Likewise, Capability_A is referred to as a direct dependency of Capability_B. Capability_A is referred to as an indirect dependency of Capability_C. If Capability_A were dependent upon another capability, that another capability would also be an indirect dependency of Capability_C, and so on. In general, in a hierarchical dependency graph, for a particular capability X in the graph, the parent capability in the graph of capability X is referred to as a direct capability dependency of capability X. All the ancestor capabilities in the graph of the parent capability are referred to as indirect capability dependencies of capability X. A capability in the dependency graph can have multiple levels of indirect capability dependencies.

The MFO then schedules releases for individual service flocks based upon the availability of published capabilities in the data center. In the above example, assuming that the capability dependencies are all required capability dependencies, where Capability_B is dependent upon Capability_A, and Capability_C is dependent upon Capability_B, the MFO will first schedule a release for the flock F_A for Service A. Upon successful execution of the release, Capability_A is published in the data center. MFO 106 will then determine that the required capability dependency (i.e., Capability_A) for the flock F_B for Service B is satisfied and will thus then schedule a release for the flock F_B for Service B. Upon successful execution of the release for Service B, Capability_B is published in the data center. MFO 106 will then determine that the required capability dependency (i.e., Capability_B) for the flock F_C for Service C is satisfied and will thus then schedule a release for the flock F_C for Service C, which results in Capability_C being published. In this manner, as more and more releases for flocks are scheduled and executed, the number of published capabilities in a data center environment increases, which in turn triggers additional releases in the data center environment.

In certain implementations, the association between an alarm and a capability is explicitly declared in a flock configuration for a service. An example of such a declaration is shown below:

```
Alarm_XYZ {
    ...
    labels = ("abc", "def", "Capability_X", "Capability_Y").
    ...
}
```

In the above example, an alarm identified by label "Alarm_XYZ" is associated with a capability labeled Capability X, and a second association is created between Alarm_XYZ and a capability labeled Capability Y. During the process of reading parsing a flock configuration, the MFO learns about these associations as declared in the flock configuration file. The MFO may then store this alarms-to-capabilities associations information such that it is usable by other systems in the data center. For example, this associations information may be used by the telemetry system, the health monitoring system, or other system in the data center for monitoring alarms and using the alarms information to determine the health of associated capabilities. In some other embodiments, MFO 106 may provide the alarms-to-capabilities associations information to interested systems in the data center.

In certain implementations, the associations learnt by the MFO are added to the alarms definitions information for the data center. An alarm can be associated with zero, one, or multiple capabilities. A capability can have zero, one, or multiple alarms associated with it. As described above, these associations between alarms and capabilities can be declared or specified in one or more flock configuration files.

Figure 4:
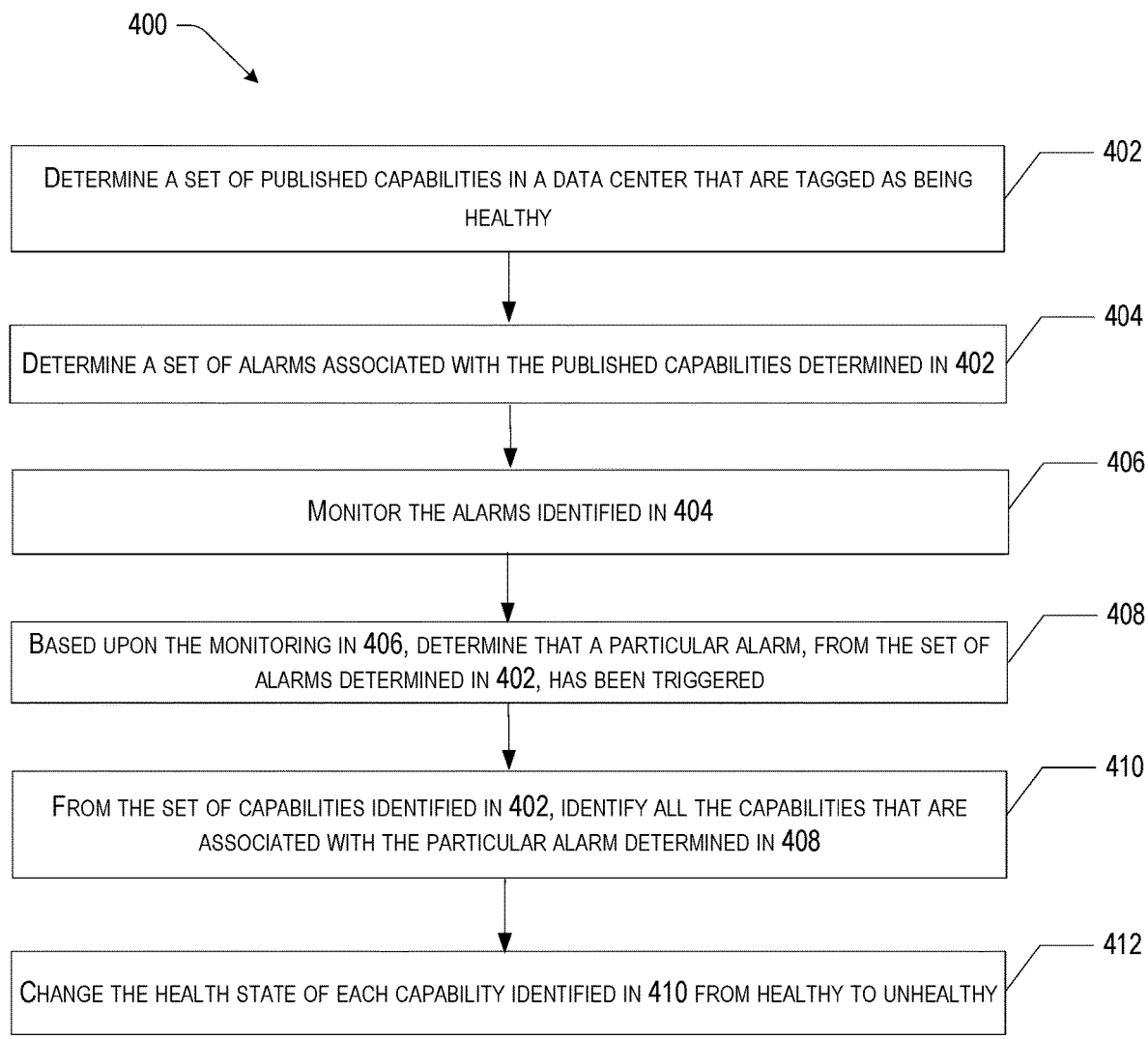
FIG. 4 depicts a simplified flowchart depicting processing performed for monitoring published capabilities in a data center using the alarms-to-capabilities associations information, according to certain embodiments.

The alarms-to-capabilities association information can be used for various different applications and use cases. In certain implementations, the alarms-to-capabilities associations information can be used to monitor the health of published capabilities in a computing environment, such as in a data center. FIG. 4 depicts a simplified flowchart 400 depicting processing performed for monitoring published capabilities in a data center using the alarms-to-capabilities associations information, according to certain embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 4 may be performed by capabilities service 112. In certain implementations, the processing depicted in FIG. 4 may be performed by a health monitoring system. In yet other implementations, the processing depicted in FIG. 4 may be performed by a telemetry system provided in a data center.

At 402, a set of capabilities that have been published in the data center environment and that are marked as being in a healthy state are determined. As previously described, in certain embodiments, capabilities service 112 depicted in FIG. 1 is responsible for keeping track of capabilities that are published. Accordingly, in 402, the set of published capabilities may be determined by querying capabilities service 112.

At 404, a set of alarms associated with the capabilities identified in 402 is determined. As described above, in certain implementations, the MFO 106 may identify and learn about alarms-to-capabilities associations when the MFO reads and parses the flock configurations during static flock analysis processing. The MFO may then provide this learnt information to a system that is configured to perform the processing depicted in FIG. 4. In certain implementations, the associations information may be stored by the MFO and can then be used by the entity performing the processing depicted in FIG. 4. The set of alarms associated with the published capabilities identified in 402 may be determined based upon this learnt alarms-to-capabilities associations information.

At 406, the alarms identified in 406 are monitored. The monitoring may be performed over a period of time. In certain implementations, the monitoring may be performed by the telemetry system and the observations from the monitoring provided by the telemetry system to the system performing the processing depicted in FIG. 4.

At 408, based upon the monitoring performed in 406, it is determined that a particular alarm, from the set of alarms identified in 404, has been triggered (i.e., the alarm is in a triggered state). The alarm may have been triggered due to some problem condition. In certain implementations, the alarm may remain triggered (e.g., in a triggered state) while the underlaying problem persists. In certain implementations, when an alarm is in a triggered state, the telemetry system may communicate information regarding the triggered alarm to the system performing the processing depicted in FIG. 4.

At 410, from the set of capabilities identified in 402, all the capabilities that are associated with the particular triggered alarm are determined. The triggered alarm may be associated with one or more of the published capabilities identified in 402.

At 412, for each capability identified in 410, the state of the capability is changed from healthy to unhealthy (or from being available to unavailable).

In certain implementations, for each capability marked as unhealthy, one or more actions may be triggered. These actions may include, for example: notifying interested parties (e.g., a system administrator of the data center) about the status change of the capability from healthy to unhealthy; one or more actions to identify the underlying problem that is causing the particular alarm to be triggered and actions to rectify that underlying problem; logging the change in status for the capability to a log file; notifying capabilities service 110 about the status of the capability being changed from healthy to unhealthy; and the like. The processing depicted in FIG. 4 and described above may be performed at periodic time periods within the data center.

In certain implementations, a change in a first capability's status from healthy to unhealthy may cause a change in the health statuses of capabilities that depend upon the first capability. For example, capability A may however have a dependent capability B, which may in turn have a dependent capability C, which may in turn have a dependent capability D, and so on. Capabilities B is a direct dependency of capability A, while C and D are indirect dependencies of capability A. In certain implementations, a change in the health status of capability A may cause a change in the health status of both the direct and indirect dependent capabilities (e.g., the health statuse of capabilities B, C, and D are changed) of capability A. In some other implementations, only the health statuse of direct capability dependencies are changed in response to a change in the health status of capability A (e.g., the health status of capability B is changed).

Figure 5:
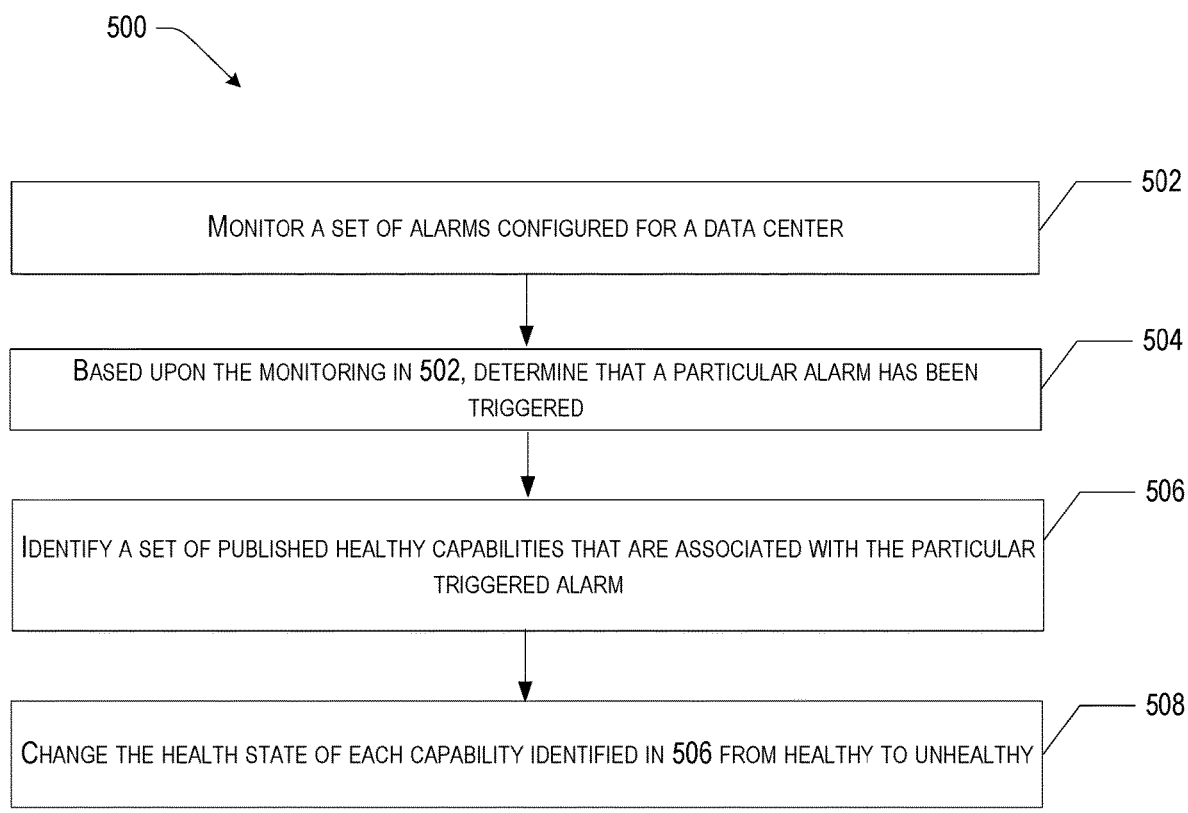
FIG. 5 depicts a simplified flowchart depicting processing performed for monitoring published capabilities in a data center using the alarms-to-capabilities associations information, according to certain embodiments.

FIG. 5 depicts a simplified flowchart 500 depicting processing performed for monitoring published capabilities in a data center using the alarms-to-capabilities associations information, according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 5 may be performed by capabilities service 112. In certain implementations, the processing depicted in FIG. 5 may be performed by a health monitoring system. In yet other implementations, the processing depicted in FIG. 4 may be performed by a telemetry system provided in a data center.

At 502, a set of alarms configured for a data center are identified and monitored. In certain implementations, the alarms are declared in the flock configurations for the various services that the data center is to provide. The MFO 106 may identify these alarms when the MFO 106 reads and parses the flock configurations during static flock analysis processing. Information may then be stored identifying the set of alarms declared for the data center.

At 504, based upon the monitoring performed in 502, it is determined that a particular alarm has been triggered from the set of alarms being monitored. For example, when an alarm is triggered, the telemetry system may communicate information regarding the triggered alarm to the system performing the processing depicted in FIG. 5.

At 506, all published capabilities that are associated with the particular triggered alarm are identified. The alarms-to-capabilities associations information may be used to identify all the published capabilities that are associated with the particular triggered alarm.

At 508, the health state for each of the capabilities identified in 506 is changed from healthy to unhealthy. As described above with respect to FIG. 4, for a capability whose state is changed from being healthy to unhealthy, one or more actions may be triggered responsive to the change.

In certain implementations, the alarms-to-capabilities associations may be used during execution of a release for a flock for a service. As previously described, when the capability dependencies of a flock for a service are satisfied, the MFO schedules a release for the flock. The release is then executed by CIOS central 108 in coordination with CIOS regional 110. In situations where the execution of a release fails, the MFO may use the alarms-to-capabilities associations information to determine possible causes for the execution failure. For example, the MFO may determine that the flock release execution may have failed due to one of the dependent capabilities being in an unhealthy state.

Figure 6:
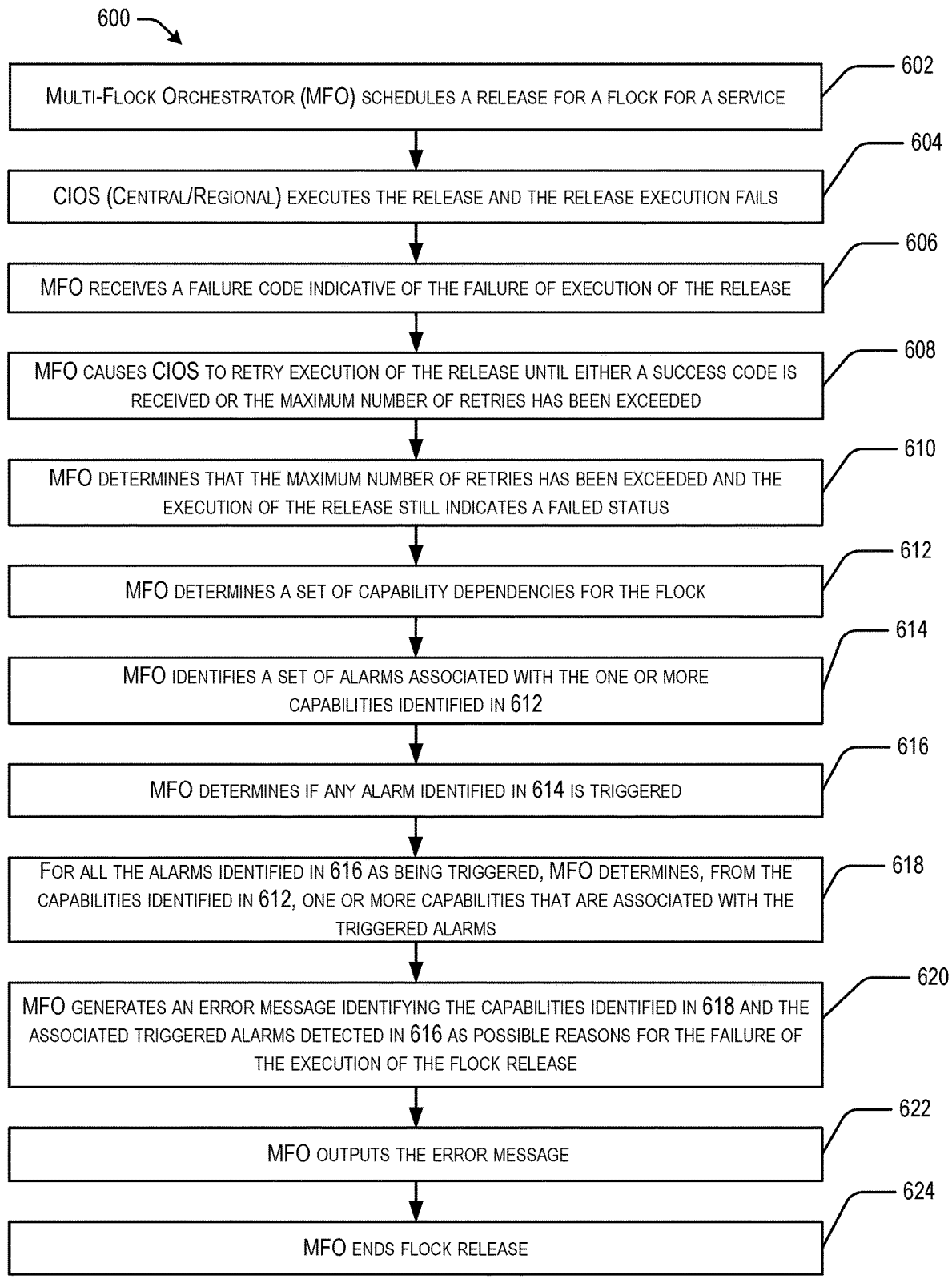
FIG. 6 depicts a simplified flowchart depicting processing performed during the release and execution of a flock, according to certain embodiments.

FIG. 6 depicts a simplified flowchart 600 depicting processing performed during the release and execution of a flock, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 6 may be performed cooperatively by MFO 106, CIOS Central 108, CIOS Regional 110, and capabilities service 112.

At 602, Multi-Flock Orchestrator (MFO) 106 schedules a release for a flock for a service. The MFO may determine that all of the required capability dependencies for the flock have been met and then schedule a release for the flock.

At 604, the release may be received and executed by CIOS Central 108 in coordination with CIOS Regional 110 and the release execution fails. In certain implementations, executing a flock release may involve determining a current state of the target data center for the service, determining a desired target state for the data center as specified in the flock configuration file for the flock being released, generating a plan to get to the target state from the current state, and then executing the plan. In certain implementations, Terraform tools may be used to execute the release. For purposes of the processing depicted in FIG. 6, it is assumed that the release execution fails.

At 606, MFO 106 may receive a failure code from CIOS Central/Regional indicating that the execution of the release failed.

At 608, MFO 106 may cause CIOS Central/Regional to retry execution of the release until either the release is successfully executed and a success code received, or the maximum number of retries has been exceeded. In certain implementations, the maximum number of retries is set to some threshold number such as 3 retries, 5 retries, and the like.

At 610, it is assumed that MFO 106 determines that the maximum number of retries has been exceeded, and the execution of the release still indicates a failed status.

At 612, MFO 106 determines a set of capability dependencies for the flock being released. In some implementations, both direct and indirect capability dependencies are determined in 612. For example, the flock configuration may identify capability A as a direct dependency. Capability A may however depend upon capability B, which may in turn depend upon capability C, which may in turn depend upon capability D, and so on. Capabilities B, C, and D are indirect dependencies of the flock. In certain implementations, as part of the processing in 612, both the direct and indirect capability dependencies are identified (e.g., capabilities A, B, C, and D are identified) for the flock being released. In some other implementations, only the direct capability dependencies are identified (e.g., capability A is identified).

At 614, MFO 106 identifies a set of alarms associated with the one or more capabilities identified in 612. In certain implementations, the alarms-to-capabilities associations information may be used to identify the alarms corresponding to the capabilities determined in 612.

At 616, the MFO 106 determines the state of each alarm identified in 614 and identifies any alarms that have been triggered. In certain implementations, MFO 106 may query the telemetry system to determine the states of the alarms.

At 618, for the alarms identified in 616 as being triggered, MFO 106 determines, from the capabilities identified in 612, a set of one or more capabilities are associated with the triggered alarms. The alarms-to-capabilities associations information may be used to identify the capabilities associated with the triggered alarms.

At 620, MFO 106 generates an error message identifying the capabilities identified in 618 and the associated triggered alarms detected in 616 as possible reasons for the failure of the execution of the flock release. At 622, MFO 106 may output the error message generated in 620. At 624, the MFO ends the execution of the flock release.

In the embodiment described above, the processing in flowchart 600 (except for 604) is performed by MFO 106. In other implementations, the processing may be performed by MFO 106 in coordination with other systems. For example, some or all of the processing may be performed by CIOS Central 108 and/or CIOS Regional 110.

Figure 7:
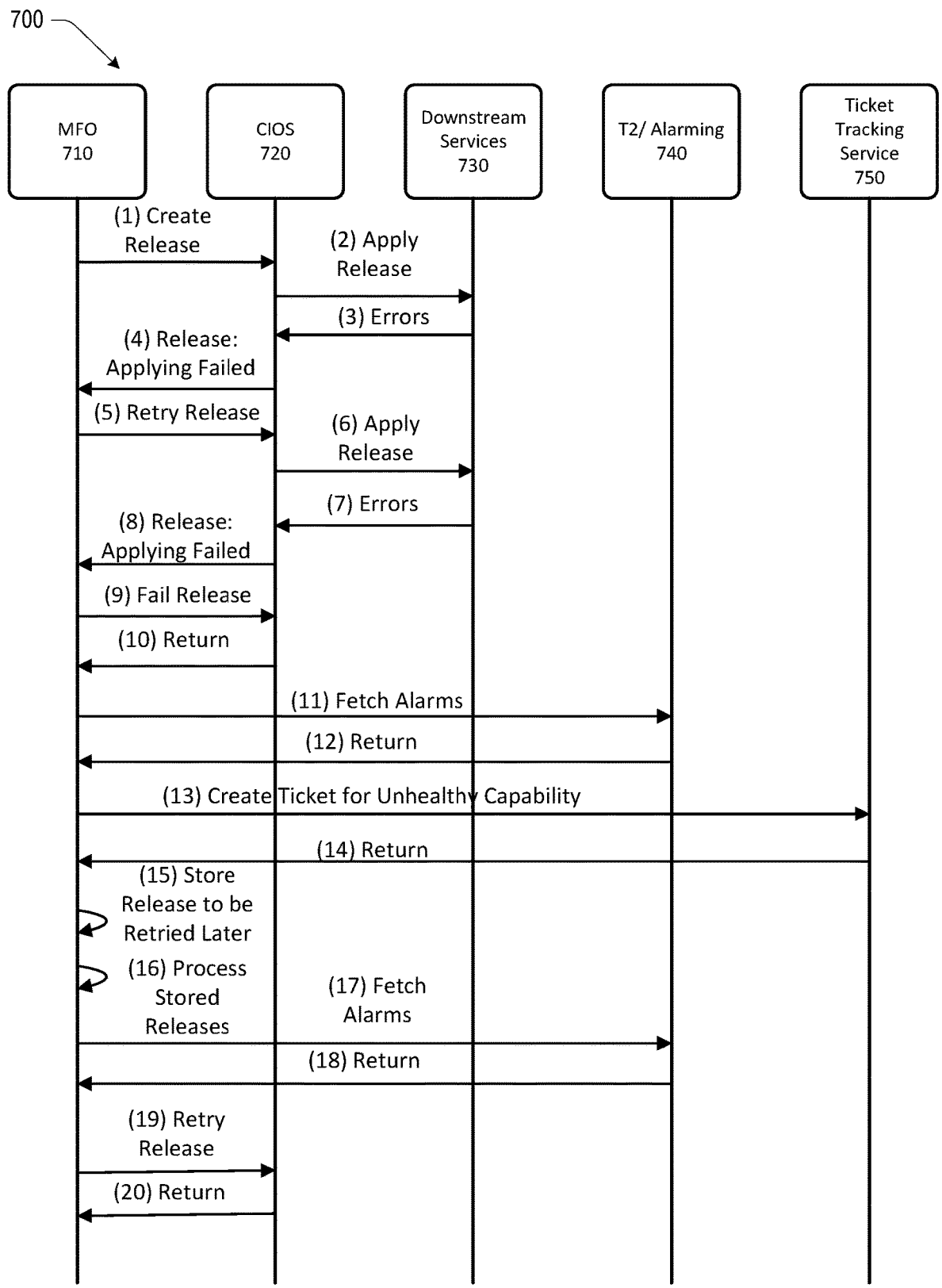
FIG. 7 depicts a swim lane flowchart showing processing performed during execution of a flock release and how alarms-to-capabilities associations can be used to identify possible reasons for failure of the execution according to certain embodiments.

FIG. 7 depicts a swim lane flowchart 700 showing processing performed during execution of a flock release and how alarms-to-capabilities associations can be used to identify possible reasons for failure of the execution according to certain embodiments. FIG. 7 shows interactions between MFO 710, CIOS 720 (which includes CIOS Central 108 and CIOS Regional 110), and other components.

At step 1, MFO 710 can create a release that is sent to CIOS 720. At step 2, the CIOS 720 can apply the release to downstream services 730. In this case the release fails and, at step 3, errors are returned from the downstream services 730 to CIOS 720. In response to the errors from 3, the CIOS 720, at step 4, sends a message indicating that the release failed to MFO 710.

At step 5, MFO 710 can instruct the CIOS 720 to retry the relase up to three times, and the CIOS 720 can attempt to apply the relase to downstream services 730 at step 6. At block 7, applying the release fails and error messages can be sent from the downstream services 730 to the CIOS 720 at 7. At step 8, an error message can be returned from CIOS 720 to MFO 710. At, step 8, MFO 710 can instruct CIOS 720 to fail the release, and, at step 10, CIOS 720 can return the failed release to MFO 710.

At step 11, MFO 710 can request the alarms associated with the failed relase from the service that manages alarms (e.g., T2/Alarming 720) to determine if the capability is unhealthy. At step 12, the requested alarms can be returned to MFO 710 by T2/Alarming 740 and the MFO 710 can determine if the capability is associated with an alarm in a triggered state (e.g., determine if the capability is unhealthy). At step 13, MFO 710 can request that the ticket management service 720 create a ticket for the unhealthy capability. At step 14, the ticket management service 750 can return the ticket to the MFO 710.

Figure 8:
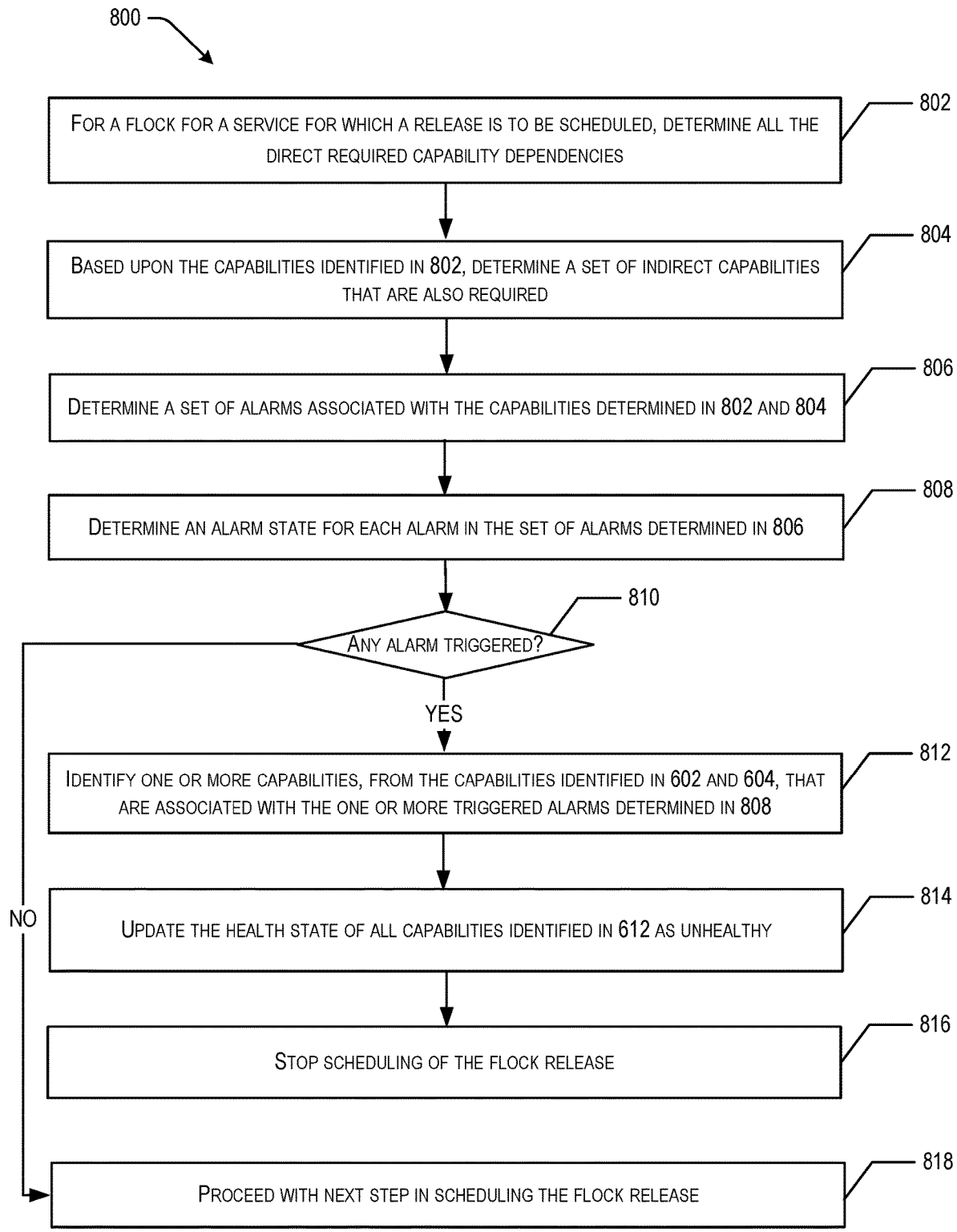
FIG. 8 depicts a simplified flowchart depicting processing performed for checking the health of capabilities prior to scheduling a flock release, according to certain embodiments.

At step 15, the MFO can store the release so that applying the release can be tried later. At step 16, any stored releases can be processed after they have been returned to a healthy state. At step 17, MFO 710 can fetch alarms to determine if the capabilities associated with the relase are in a healthy state, and, at step 18, the T2/Alarming 740 can return any alarms associated with the capabilities. At step 19, if there are no alarms associated with the capabilities at 18 and the release is healthy, the MFO 710 can retry the release by sending an instruction to CIOS 720. At step 20, CIOS 720 can return an acknowledgement and attempt the release In certain implementations, MFO 106 may use the alarms-to-capabilities associations to check the health of published capabilities prior to scheduling a release for a flock. FIG. 8 depicts a simplified flowchart 800 depicting processing performed for checking the health of capabilities prior to scheduling a flock release, according to certain embodiments. The processing depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 8 may be performed by MFO 106.

At 802, for a flock for a service for which a release is to be scheduled, MFO 106 determines the direct capability dependencies (e.g., direct capabilities) for the flock configuration. At 804, based upon the direct capability dependencies determined in 804, MFO 106 determines a set of indirect capabilities that are also required before a release for the flock can be scheduled.

At 806, MFO 106 determines a set of alarms associated with the capabilities determined in 602 and 604. In certain implementations, MFO 106 may use the alarms-to-capabilities associations information to determine the set of alarms in 806.

At 808, MFO determines the state of each alarm determined in 806. In certain implementations, MFO 106 may determine the state of an alarm from a telemetry system that is configured to monitor alarm states for alarms configured for a data center.

At 810, based upon the alarm states determined in 808, MFO 106 identifies any alarm that is in a triggered state. If it is determined in 810 that there is no triggered alarm, then processing continues with 818 wherein MFO 106 continues with scheduling the release for the flock configuration. If it is determined in 810 that there is at least one triggered alarm, then in 812, MFO 106 identifies one or more capabilities, from those identified in 802 and 804, that are associated with the one or more triggered alarms.

At 814, MFO 106 causes the health state associated with the capabilities identified in 812 to be marked as unhealthy. At 816, the flock release scheduling is stopped.

In the manner described above, the MFO may use the alarms-to-capabilities associations information to perform capability checks prior to scheduling a release for a flock configuration for a service.

The various systems depicted in FIGS. 1, 2, and 3, and described above, and the functionalities depicted in FIGS. 4, 5, 6, 7, and 8, and described above may be provided as part of infrastructure provided by a cloud services provider (CSP) for provisioning one or more data centers that may provide one or more cloud services. One or more of these cloud services may be subscribable by one or more customers of the CSP. FIGS. 9, 10, 11, and 12, and the accompanying description below describes examples of infrastructure that may be used to implement the cloud services, including Infrastructure-as-a-Service services. FIG. 13 depicts an example computer system that may be used to execute and implement the various functionalities described in this disclosure.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
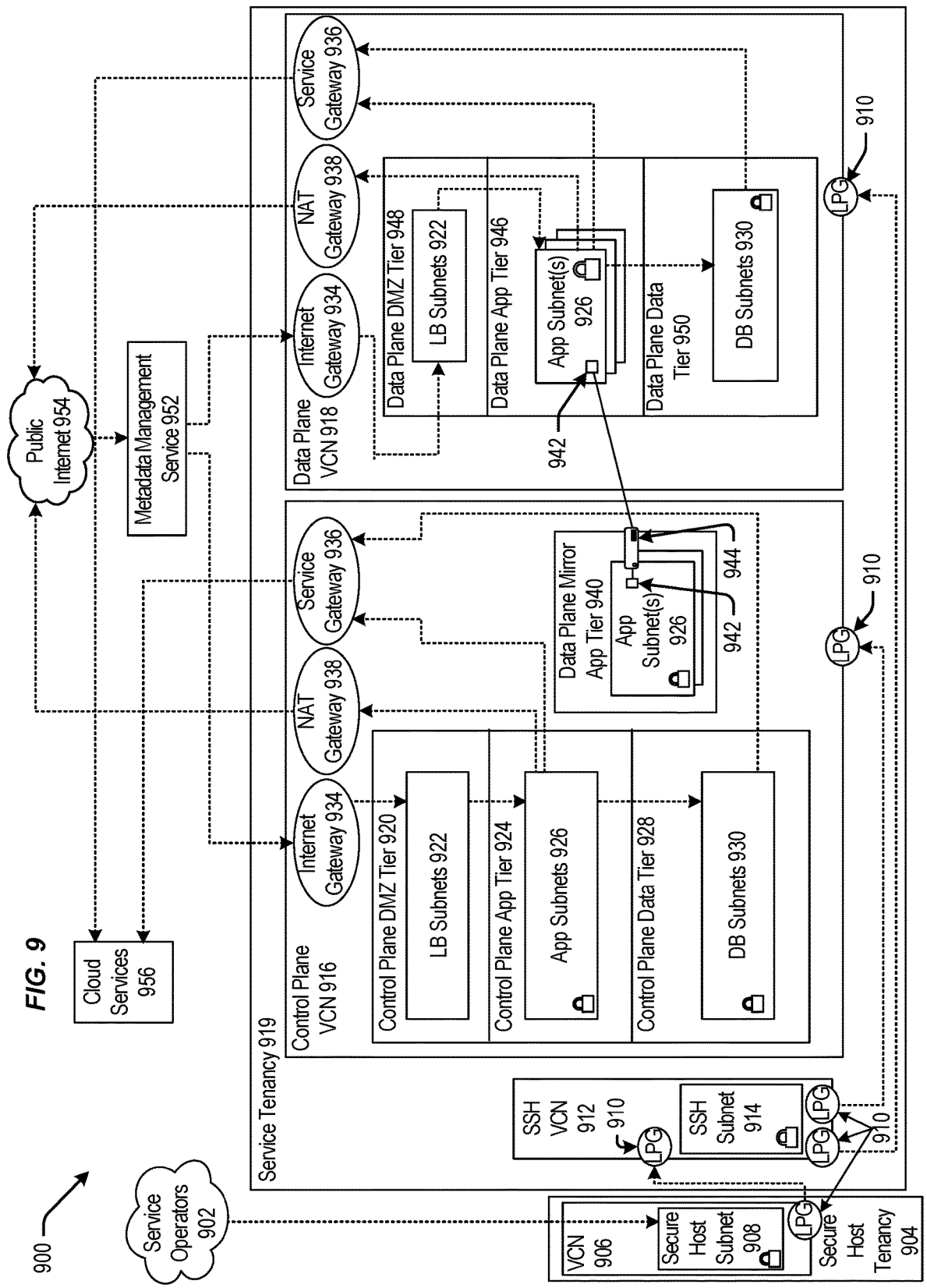
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
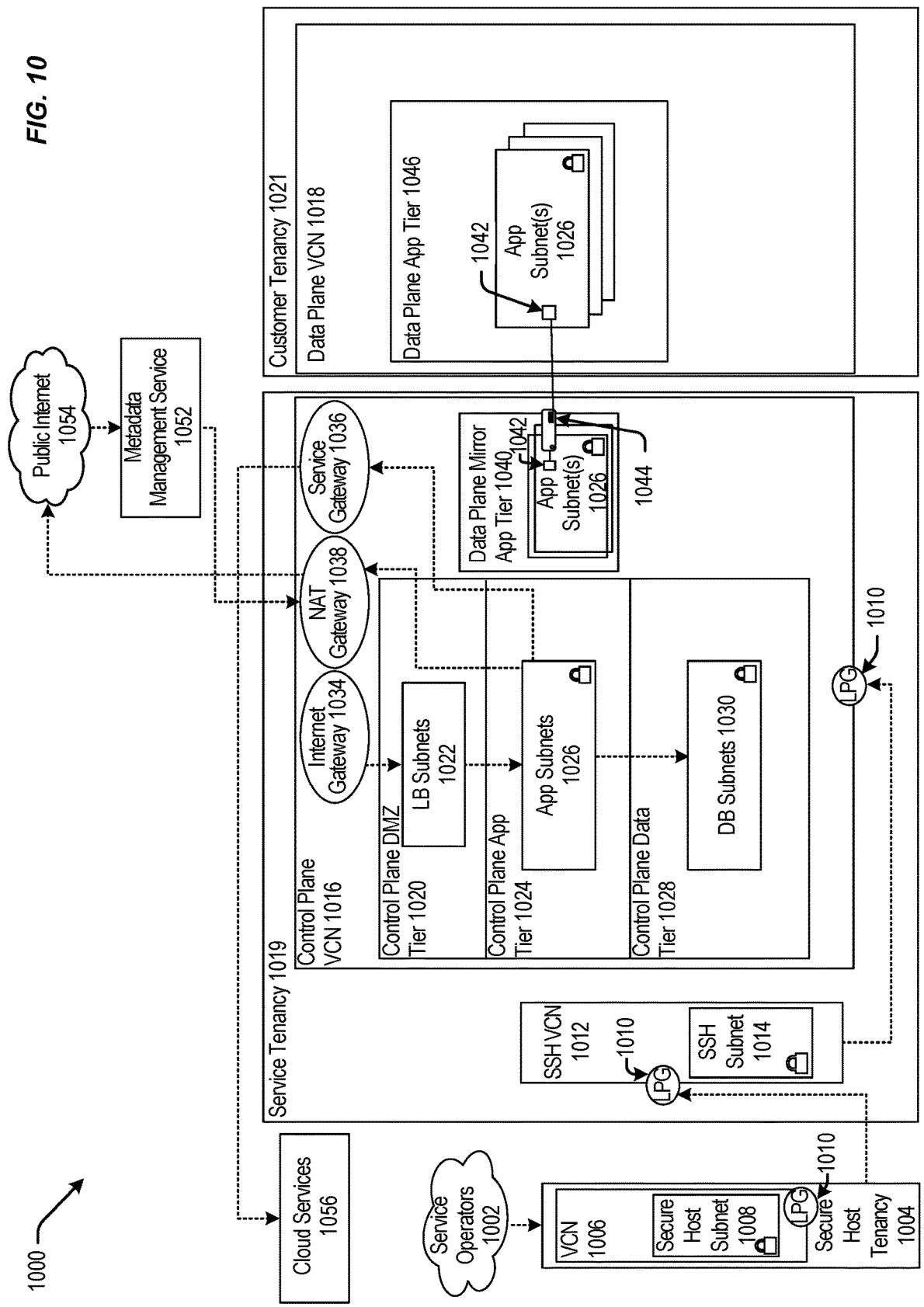
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
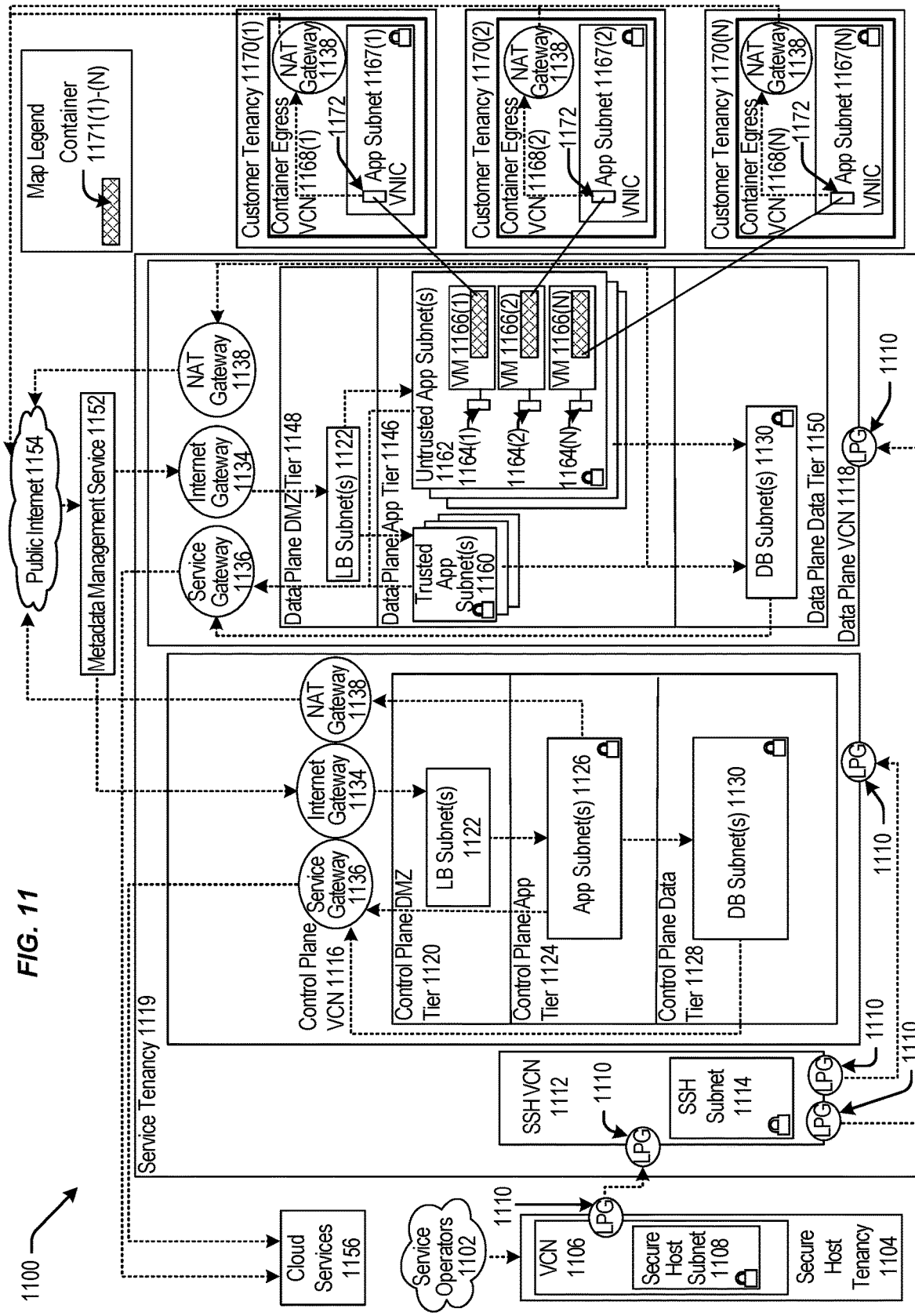
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162, which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
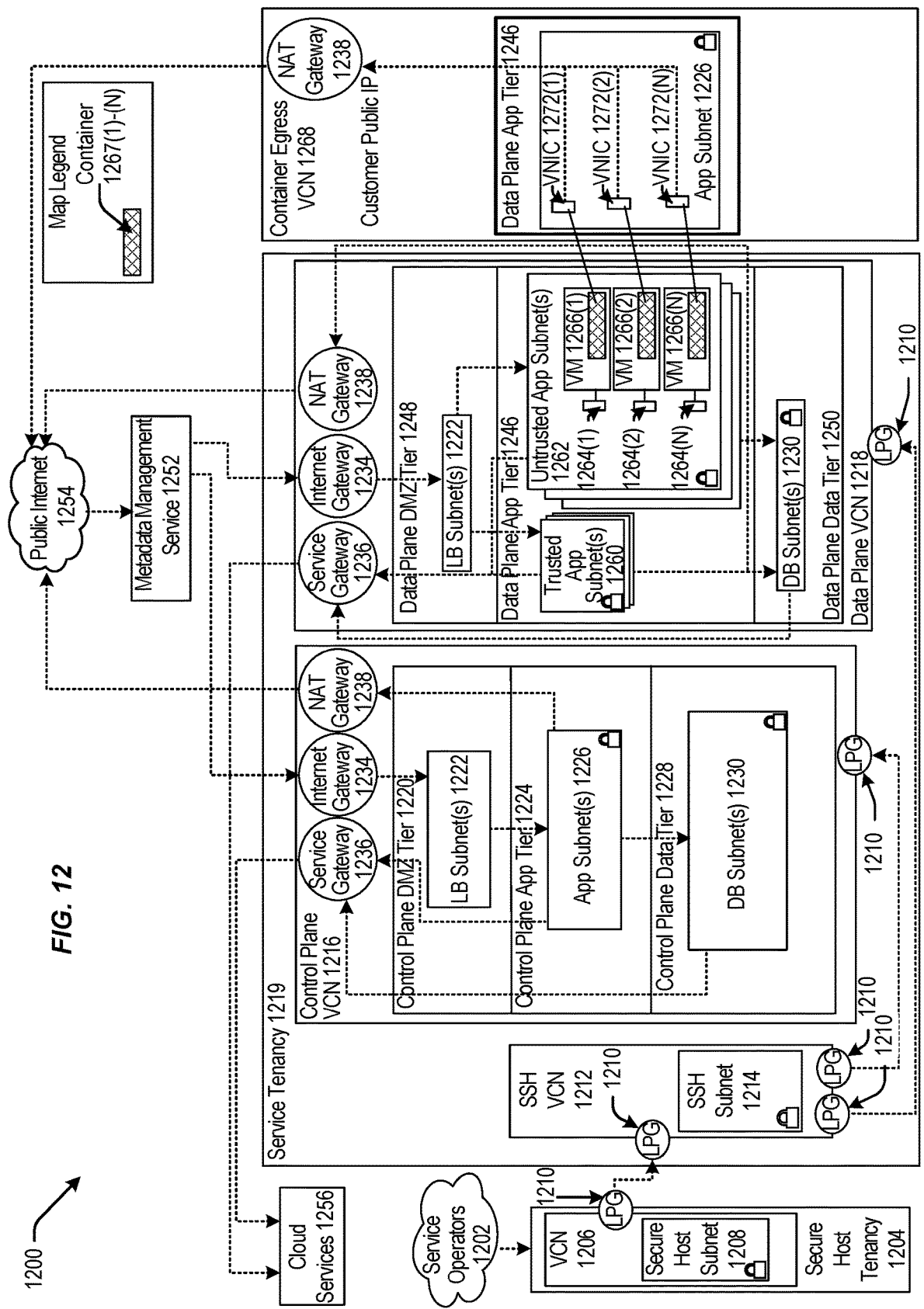
FIG. 12 is a block diagram illustrating another pattern for implementing a cloud infrastructure as a service system, according to at least one embodiment.
Figure 13:
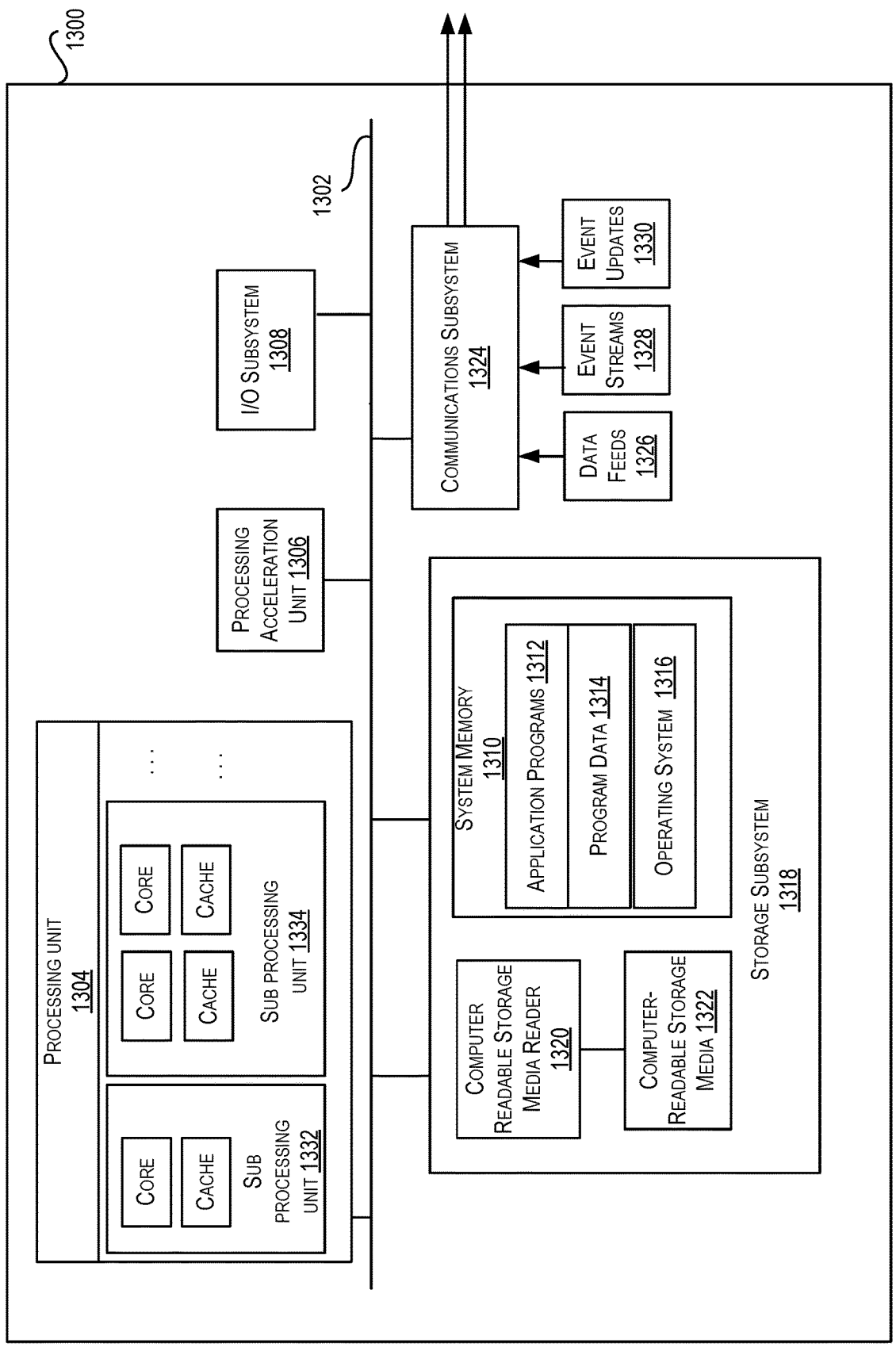
FIG. 13 is a block diagram illustrating an example computer system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262

(e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    identifying an association between an alarm and a first capability, wherein the first capability corresponds to a functionality associated with a first service;
    monitoring the alarm;
    determining that the alarm is in a triggered state based on the monitoring;
    responsive to determining that the alarm is in a triggered state, changing a state of the first capability from a healthy state to an unhealthy state; and
    responsive to changing the state of the first capability from the healthy state to the unhealthy state:
        determining that a flock for a second service is dependent on the first capability, and
        delaying a release of the flock for the second service.

2. The method of claim 1, wherein the functionality associated with the first service corresponds to a resource associated with the first service.

3. The method of claim 1 wherein the association between the alarm and the first capability is declared in a flock configuration for the first service, the flock configuration identifying a set of resources associated with the first service.

4. The method of claim 3, wherein the flock configuration identifies one or more parameters related to the first service and a configuration setting for at least one resource related to the first service.

5. The method of claim 1, further comprising:
    determining that the release of the flock for the second service has been delayed; and
    outputting a message identifying the first capability and the unhealthy state of the first capability as a reason for delay of the release of the flock for the second service.

6. The method of claim 5, further comprising:
    retrying the release of the flock for the second service upon determining that the state of the first capability is healthy.

7. The method of claim 1, further comprising:
    responsive to changing the state of the first capability to unhealthy:
        determining one or more dependent capabilities that are dependent upon the first capability whose state is changed from healthy to unhealthy; and
        changing the state of each of the one or more dependent capabilities to unhealthy.

8. The method of claim 1, wherein the monitoring is performed by a telemetry service.

9. The method of claim 1, further comprising:
    creating an association between the alarm and a second capability, the second capability corresponding to a functionality associated with a second service, wherein the second service is different from the first service.

10. The method of claim 1, further comprising:
    identifying a set of one or more capabilities published in a data center that are marked as healthy and that are associated with the alarm; and
    changing the state of each capability in the set of one or more capabilities from healthy to unhealthy.

11. The method of claim 1, further comprising:
    scheduling a release of the flock for the second service upon determining that the state of the first capability has changed from unhealthy to healthy.

12. A method comprising:
    determining a set of direct capabilities for a flock configuration of a flock for which a release is to be scheduled;
    identifying a set of indirect capabilities that depend from the set of direct capabilities;
    determining a set of alarms associated with at least one of the set of direct capabilities or the set of indirect capabilities;
    monitoring a set of alarm states for the set of alarms;
    determining that at least one alarm of the set of alarms is in a triggered state based on the monitoring;
    responsive to determining that the at least one alarm is in the triggered state, changing a state of the set of direct capabilities and the set of indirect capabilities associated with the at least one alarm that is in a triggered state from a healthy state to an unhealthy state; and
    responsive to changing the state of the set of direct capabilities and the set of indirect capabilities from the healthy state to the unhealthy state:

determining that a flock for a second service is dependent on at least one capability of the set of direct capabilities and the set of indirect capabilities, and delaying a release of the flock for the second service.

13. The method of claim 12, further comprising:

updating the state of the set of direct capabilities and the set of indirect capabilities from a healthy state to an unhealthy state.

14. A system comprising:

a memory, the memory storing an association between an alarm and a first capability, the first capability corresponding to a functionality corresponding to a set of resources for a first service; and one or more processors configured to:

identify the association between the alarm and the first capability, wherein the first capability corresponds to the functionality associated with the first service;

monitor the alarm;

determine that the alarm is in a triggered state based on the monitoring;

responsive to determining that the alarm is in a triggered state, change a state of the first capability from a healthy state to an unhealthy state; and responsive to changing the state of the first capability from the healthy state to the unhealthy state:

determine that a flock for a second service is dependent on the first capability, and delay a release of the flock for the second service.

15. The system of claim 14, wherein the functionality associated with the first service corresponds to a resource associated with the first service.

16. The system of claim 14 herein the association between the alarm and the first capability is declared in a flock configuration for the first service, the flock configuration identifying a set of resources associated with the first service.

17. The system of claim 16, wherein the flock configuration identifies one or more parameters related to the first service and a configuration setting for at least one resource related to the first service.

18. The system of claim 14, further comprising:

determine that the release of the flock for the second service has been delayed; and output a message identifying the first capability and the unhealthy state of the alarm as a reason for delay of the release of the flock for the second service.

\* \* \* \* \*

UNITED STATES PATENT AND TRADEMARK OFFICE
CERTIFICATE OF CORRECTION

Page 1 of 1

PATENT NO. : 12,242,330 B2
APPLICATION NO. : 18/164283
DATED : March 4, 2025
INVENTOR(S) : Mysore Jagadeesh et al.

It is certified that error appears in the above-identified patent and that said Letters Patent is hereby corrected as shown below:

In the Specification

In Column 2, Line 54, delete "technqies" and insert -- techniques --, therefor.

In Column 13, Line 30, delete "1n" and insert -- In --, therefor.

In Column 23, Line 12, delete "FCC" and insert -- FC_C --, therefor.

In Column 25, Line 59, delete "statuses" and insert -- status --, therefor.

In Column 26, Line 1, delete "statuse" and insert -- status --, therefor.

In Column 26, Line 3, delete "statuse" and insert -- status --, therefor.

In Column 28, Line 36, delete "relase" and insert -- release --, therefor.

In Column 28, Line 37, delete "relase" and insert -- release --, therefor.

In Column 28, Line 45, delete "relase" and insert -- release --, therefor.

In Column 28, Line 59, delete "relase" and insert -- release --, therefor.

In Column 28, Line 65, delete "release" and insert -- release. --, therefor.

Signed and Sealed this
Third Day of June, 2025

Coke Morgan Stewart
*Acting Director of the United States Patent and Trademark Office*